United States Patent
Da Silva

(10) Patent No.: US 12,022,340 B2
(45) Date of Patent: Jun. 25, 2024

(54) USER EQUIPMENT, TARGET NETWORK NODE AND METHODS IN A WIRELESS COMMUNICATIONS NETWORK

(71) Applicant: Telefonaktiebolaget LM Ericsson (publ), Stockholm (SE)

(72) Inventor: Icaro L. J. Da Silva, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 455 days.

(21) Appl. No.: 17/293,955

(22) PCT Filed: Nov. 12, 2019

(86) PCT No.: PCT/SE2019/051142
§ 371 (c)(1),
(2) Date: May 14, 2021

(87) PCT Pub. No.: WO2020/101557
PCT Pub. Date: May 22, 2020

(65) Prior Publication Data
US 2022/0007243 A1     Jan. 6, 2022

Related U.S. Application Data

(60) Provisional application No. 62/768,124, filed on Nov. 16, 2018.

(51) Int. Cl.
*H04W 36/00*  (2009.01)
*H04W 36/08*  (2009.01)
*H04W 48/06*  (2009.01)

(52) U.S. Cl.
CPC ... *H04W 36/0079* (2018.08); *H04W 36/0069* (2018.08); *H04W 36/08* (2013.01); *H04W 48/06* (2013.01)

(58) Field of Classification Search
CPC ......... H04W 36/0079; H04W 36/0069; H04W 36/08; H04W 48/06
(Continued)

(56) References Cited

U.S. PATENT DOCUMENTS

| | | | |
|---|---|---|---|
| 2014/0146671 A1* | 5/2014 | Diachina | H04W 48/06 370/230 |
| 2016/0286449 A1* | 9/2016 | Choi | H04W 36/04 |

(Continued)

FOREIGN PATENT DOCUMENTS

| | | |
|---|---|---|
| WO | 2018145879 A1 | 8/2018 |
| WO | 2018172600 A1 | 9/2018 |

OTHER PUBLICATIONS

International Search Report and Written Opinion dated Jan. 8, 2020 for International Application No. PCT/SE2019/051142 filed Nov. 12, 2019, consisting of 12-pages.

(Continued)

*Primary Examiner* — Mong-Thuy T Tran
(74) *Attorney, Agent, or Firm* — Weisberg I.P. Law, P.A.

(57) ABSTRACT

A method performed by a User Equipment (UE) in a wireless communications network is provided. When a condition is fulfilled for accessing a target cell, the UE sends a first message to the target network node. The first message indicates that the condition is fulfilled for accessing the target cell. The UE then obtains as a response to the first message, an indication that an access to the target cell is rejected, which indication protects the target cell to be accessed by the UE.

16 Claims, 17 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2016/0353330 A1* | 12/2016 | Naik | H04W 36/0022 |
| 2017/0156095 A1* | 6/2017 | Balan | H04W 36/0072 |
| 2017/0257816 A1 | 9/2017 | Teyeb et al. | |
| 2021/0377830 A1* | 12/2021 | Jin | H04W 4/44 |

OTHER PUBLICATIONS

3GPP TSG RAN WG2 Meeting #104 R2-1816691 Revision of R2-1814051; Title: Discussion of conditional handover; Agenda Item: 12.3.3; Source: Intel Corporation; Document for: Discussion and Decision; Date and Location: Nov. 8-12, 2018, Spokane, USA, consisting of 4-pages.

3GPP TS 38.331 V15.3.0; 3rd Generation Partnership Project; Technical Specification Group Radio Access Network; NR; Radio Resource Control (RRC) protocol specification (Release 15), Sep. 2018, consisting of 445-pages.

3GPP TSG-RAN WG2 #97 Tdoc R2-1700864 (Update of 1700544); Title: Conditional Handover; Agenda Item: 10.3.1.1.2; Source: Ericsson; Document for: Discussion, Decision; Date and Location: Jan. 13-17, 2017, Athens, Greece, consisting of 5-pages.

3GPP TS 36.331 V15.3.0; 3rd Generation Partnership Project; Technical Specification Group Radio Access Network; Evolved Universal Terrestrial Radio Access (E-UTRA); Radio Resource Control (RRC); protocol specification (Release 15), Sep. 2018, consisting of 918-pages.

3GPP TS 38.213 V15.3.0; 3rd Generation Partnership Project; Technical Specification Group Radio Access Network; NR; Physical layer procedures for control (Release 15), Sep. 2018, consisting of 101-pages.

3GPP TS 38.321 V15.3.0; 3rd Generation Partnership Project; Technical Specification Group Radio Access Network; NR; Medium Access Control (MAC) protocol specification (Release 15), Sep. 2018, consisting of 76-pages.

* cited by examiner

Fig. 6 Method in the UE 120

Fig. 7 Method in the target network node 112

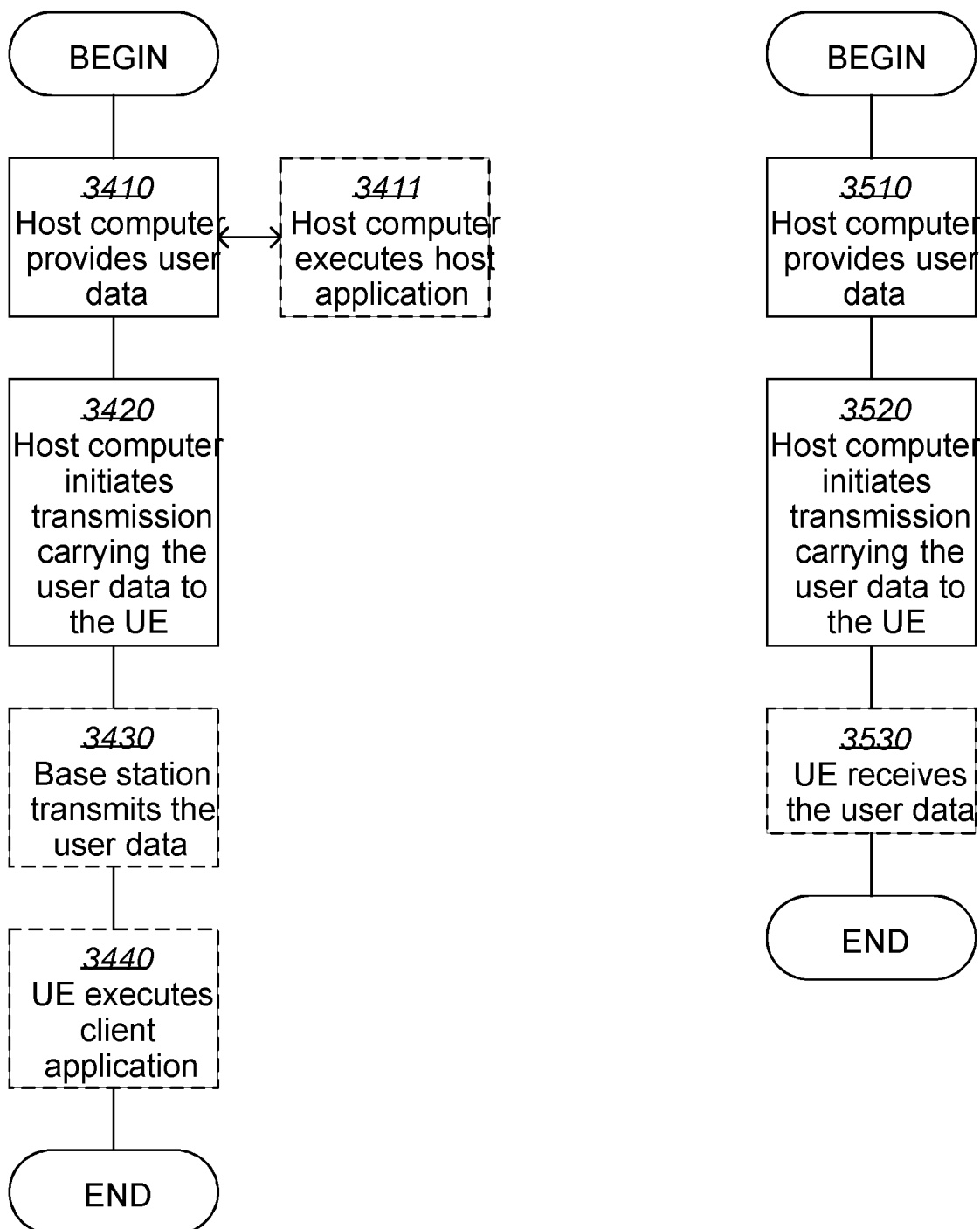

USER EQUIPMENT, TARGET NETWORK NODE AND METHODS IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2019/051142, filed Nov. 12, 2019 entitled "USER EQUIPMENT, TARGET NETWORK NODE AND METHODS IN A WIRELESS COMMUNICATIONS NETWORK," which claims priority to U.S. Provisional Application No.: 62/768,124, filed Nov. 16, 2018, the entireties of both of which are incorporated herein by reference.

TECHNICAL FIELD

Embodiments herein relate to a User Equipment (UE), a target network node, and methods therein. In particular, they relate to protecting a target cell served by the target network node from being accessed by the UE in a wireless communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Mobility in RRC_CONNECTED in LTE and NR

A Radio Resource Control (RRC) connected UE, also referred to as an RRC_CONNECTED UE in LTE, also called Evolved Universal Terrestrial Radio Access (EU-TRA) can be configured by a network to perform measurements and, upon triggering measurement reports the network may send a handover command to the UE. In LTE an RRConnectionReconfiguration with a field called mobilityControlInfo and in NR an RRCReconfiguration with a reconfigurationWithSync field. These reconfigurations are actually prepared by a target network node providing a target cell upon a request from a source network node. The request may be sent over X2 interface in case of EUTRA-EPC or Xn interface in case of EUTRA-5GC or NR, and takes into account an existing RRC configuration that the UE has with the source network node providing a source cell.

The X2 interface is the interface between The existing RRC configuration is provided in an inter-node request. Among other parameters that reconfiguration provided by target contains all information the UE needs to access the target cell 116, e.g., random access configuration, a new C-RNTI assigned by the target cell 116 and security parameters enabling the UE to calculate new security keys associated to the target cell 116 so the UE can send a handover complete message on an Signalling Radio Bearer 1 (SRB1), encrypted and integrity protected, based on new security keys upon accessing the target cell.

The FIGS. 1a, b and c summarize the flow signalling between UE, source network node and target node during a handover procedure. FIG. 1a summarizes the flow signalling between UE, source network node and target node during handover preparation in the handover procedure. FIG. 1b summarizes the flow signalling between UE, source network node and target node during a handover execution in the handover procedure. FIG. 1c summarizes the flow signalling between UE, source network node and target node during a handover completion in the a handover procedure.

Both in LTE and NR, some principles exist for handovers, or in more general terms, mobility in RRC_CONNECTED:
  Mobility in RRC_CONNECTED is network-based as a network also referred to as the wireless communications network, has best information regarding current situation such as load conditions, resources in different nodes, available frequencies, etc. The network, may also take into account the situation of many UEs in the network, for a resource allocation perspective.
  The network prepares a target cell before the UE accesses that cell. A source network node provides the UE with an RRC configuration to be used in the target cell, including SRB1 configuration to send Handover (HO) complete.
  The UE is provided by the target network node with a target Cell Random Network Temporary Identifier (C-RNTI), i.e. the target network node identifies the UE from MSG.3 on MAC level for the HO complete message. Hence, there is no context fetching, unless a failure occurs.
  To speed up the handover, the network provides needed information on how to access the target e.g. Random Access Channel (RACH) configuration, so the UE does not have to acquire SI prior to the handover.

The UE may be provided with Contention Free Random Access (CFRA) resources, i.e. in that case target identifies the UE from the preamble Message 1 (MSG1). The principle behind here is that the procedure may always be optimized with dedicated resources. In Conditional HO (CHO) that might be a bit tricky as there is uncertainty about the final target but also the timing.

Security is prepared before the UE accesses the target cell i.e. Keys must be refreshed before sending RRC Connection Reconfiguration Complete message, based on new keys and encrypted and integrity protected so UE can be verified in target cell.

Both full and delta reconfiguration are supported so that the HO command can be minimized.

Mobility robustness Work Item in Release 16 for LTE and NR and Conditional HO

Two new work items for mobility enhancements in LTE and NR have started in 3GPP in release 16. The main objectives of the work items are to improve the robustness at handover and to decrease the interruption time at handover.

One problem related to robustness at handover is that the HO Command, RRCConnectionReconfiguration with mobilityControlInfo and RRCReconfiguration with a reconfigurationWithSync field, is normally sent when the radio conditions for the UE are already quite bad. That may lead to that the HO Command may not reach the UE in time if the message is segmented or there are retransmissions.

In LTE and NR, different solutions to increase mobility robustness have been discussed in the past. One solution discussed in NR is called "conditional handover" or "early handover command". In order to avoid the undesired dependence on the serving radio link upon the time and radio conditions where the UE should execute the handover, the possibility to provide RRC signaling for the handover to the UE earlier should be provided. To achieve this, it should be possible to associate the HO command with a condition, e.g. based on radio conditions possibly similar to the ones associated to an A3 event, where a given neighbour becomes X db better than target. As soon as the condition is fulfilled, the UE executes the handover in accordance with the provided handover command.

Such a condition may e.g. be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell 115 and the UE is still stable. The execution of the handover is done at a later point in time (and threshold) which is considered optimal for the handover execution.

FIG. 2 depicts an example of a Conditional handover execution with just a serving and a target cell. In practice there may often be many cells or beams that the UE reported as possible candidates based on its preceding RRM measurements (Step 1). The network should then have the freedom to issue conditional handover commands (Step 4) for several of those candidates, e.g. after an early HO request to the target gNB (Step 2) and after receiving an HO Ack from the target gNB (Step 3). The RRCConnectionReconfiguration for each of those candidates may differ e.g. in terms of the HO execution condition, RS to measure and threshold to exceed, as well as in terms of the RA preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

SUMMARY

An object of embodiments herein is to improve the performance of a wireless communications network using handover.

According to an aspect of embodiments herein, the object is achieved by a method performed by a User Equipment, UE, in a wireless communications network. When a condition is fulfilled for accessing a target cell, the UE sends a first message to the target network node. The first message indicates that the condition is fulfilled for accessing the target cell. The UE then obtains as a response to the first message, an indication that an access to the target cell is rejected, which indication protects the target cell to be accessed by the UE.

According to another aspect of embodiments herein, the object is achieved by a method performed by a target network node in a wireless communications network. The target network node receives a first message from a User Equipment, UE. The first message indicates that a condition is fulfilled for the UE to access a target cell served by the target access node. The target network node sends an indication to the UE. The indication indicates that the access to the target cell is rejected. The indication protects the target cell from being accessed by the UE.

According to another aspect of embodiments herein, the object is achieved by a User Equipment, UE, in a wireless communications network. The UE is configured to:

When a condition is fulfilled for accessing a target cell, send a first message, to the target network node, which first message is adapted to indicate that the condition is fulfilled for accessing the target cell, and obtain an indication that the access to the target cell is rejected, which indication is adapted to protect the target cell to be accessed by the UE.

According to another aspect of embodiments herein, the object is achieved by a target network node in a wireless communications network. The target network node is configured to:

Receive a first message from the UE, which first message indicates that a condition is fulfilled for the UE to access the target cell, and send to the UE an indication that the access to the target cell is rejected, which indication is adapted to protect the target cell from being accessed by the UE.

BRIEF DESCRIPTION OF THE DRAWINGS

Examples of embodiments herein are described in more detail with reference to attached drawings in which:

FIGS. 14-17 are flowcharts illustrating methods implemented in a communication system including a host computer, a base station and a user equipment.

DETAILED DESCRIPTION

As a part of developing embodiments herein the inventors identified a problem which first will be discussed.

Reject Received in Response to an RRCSetupRequest or RRCResumeRequest

In NR, an RRC_INACTIVE, a UE may send a request to resume a connection and receive in response an RRCReject message with a wait time value. Upon the reception of that message, the UE perform a set of actions, such as e.g. stop timers, reverting of configurations, etc. Then, the UE remains camped on the same cell it has tried to resume. The UE also starts a wait timer T302 with the value set to the received value in the RRCReject message. While the timer is running the connection is considered barred for all access categories (except "0" and "2") i.e. the UE cannot try to resume or setup again except for an emergency call or if it is paged by the network.

Figure 1A:
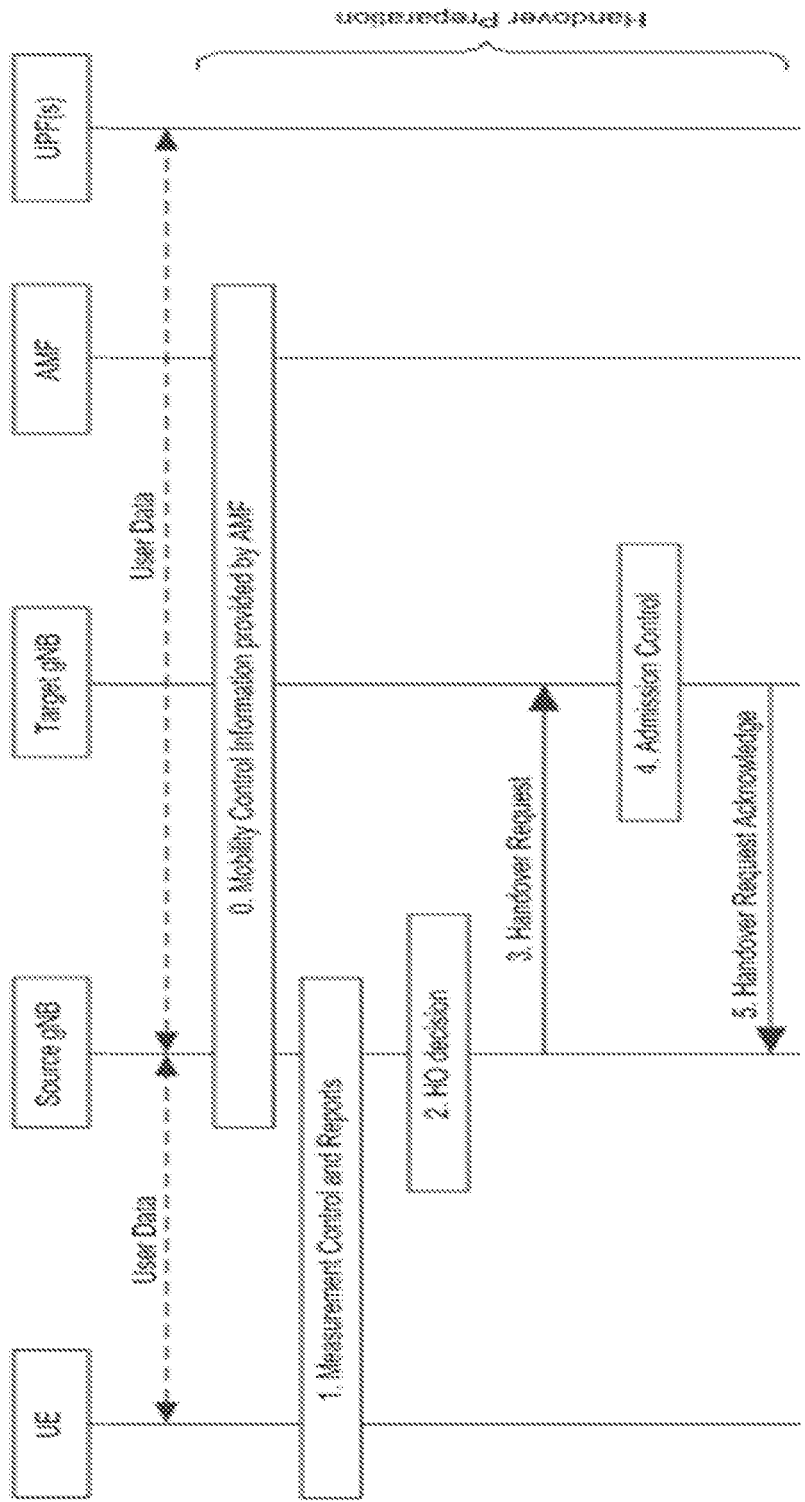
FIGS. 1a, b and c are a schematic sequence diagrams illustrating prior art.
Figure 1B:
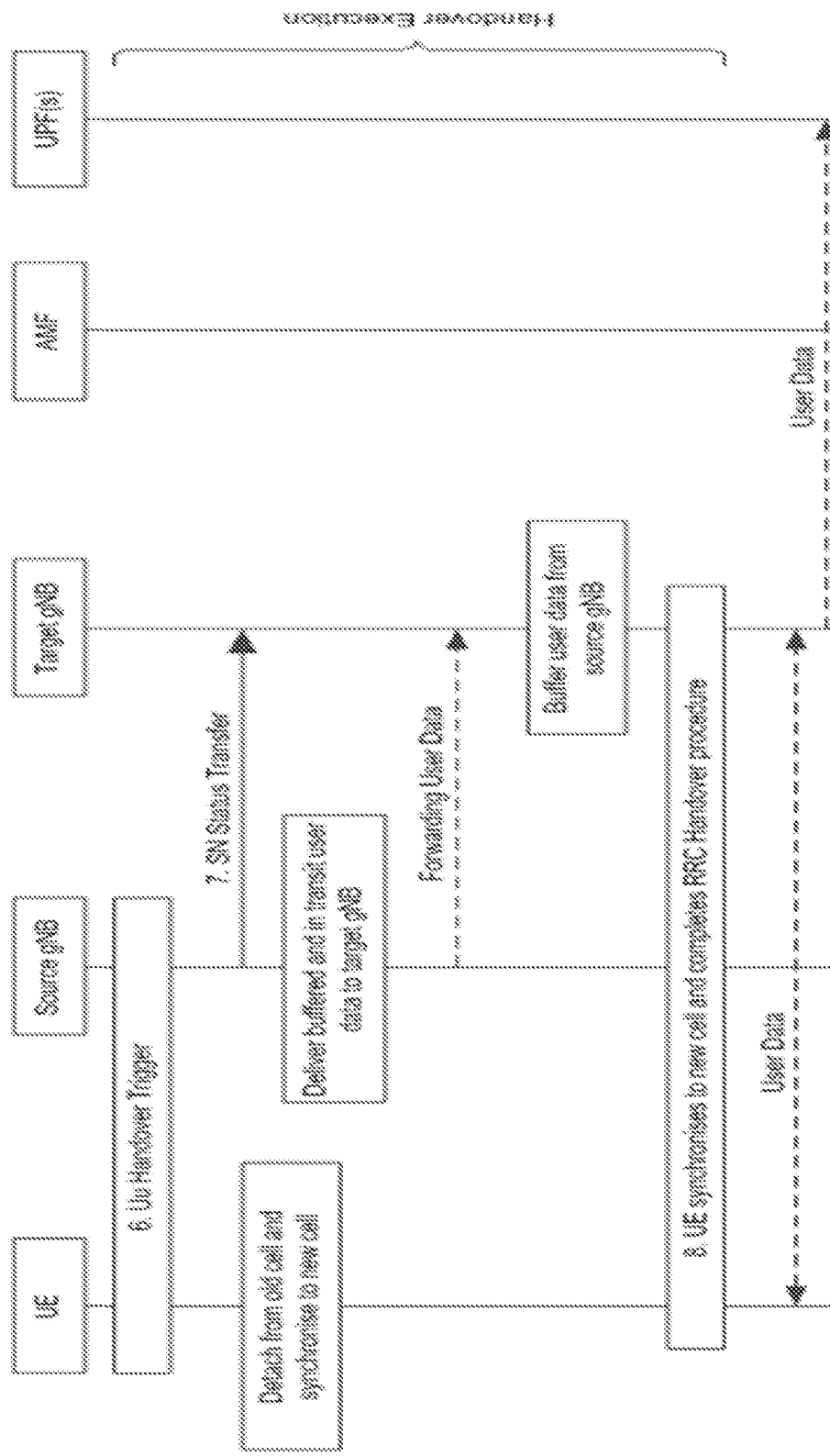
Figure 1C:
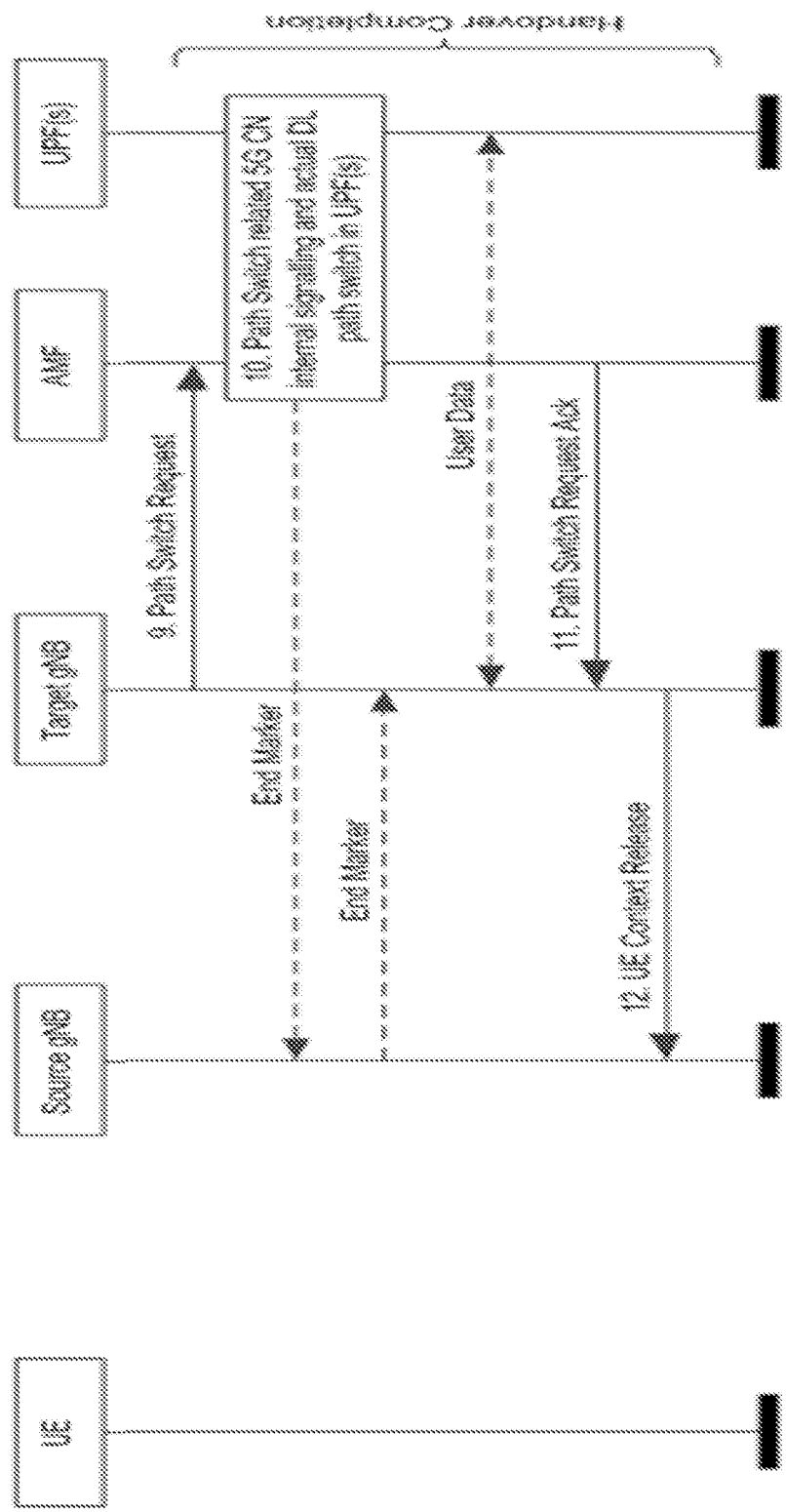
Figure 2:
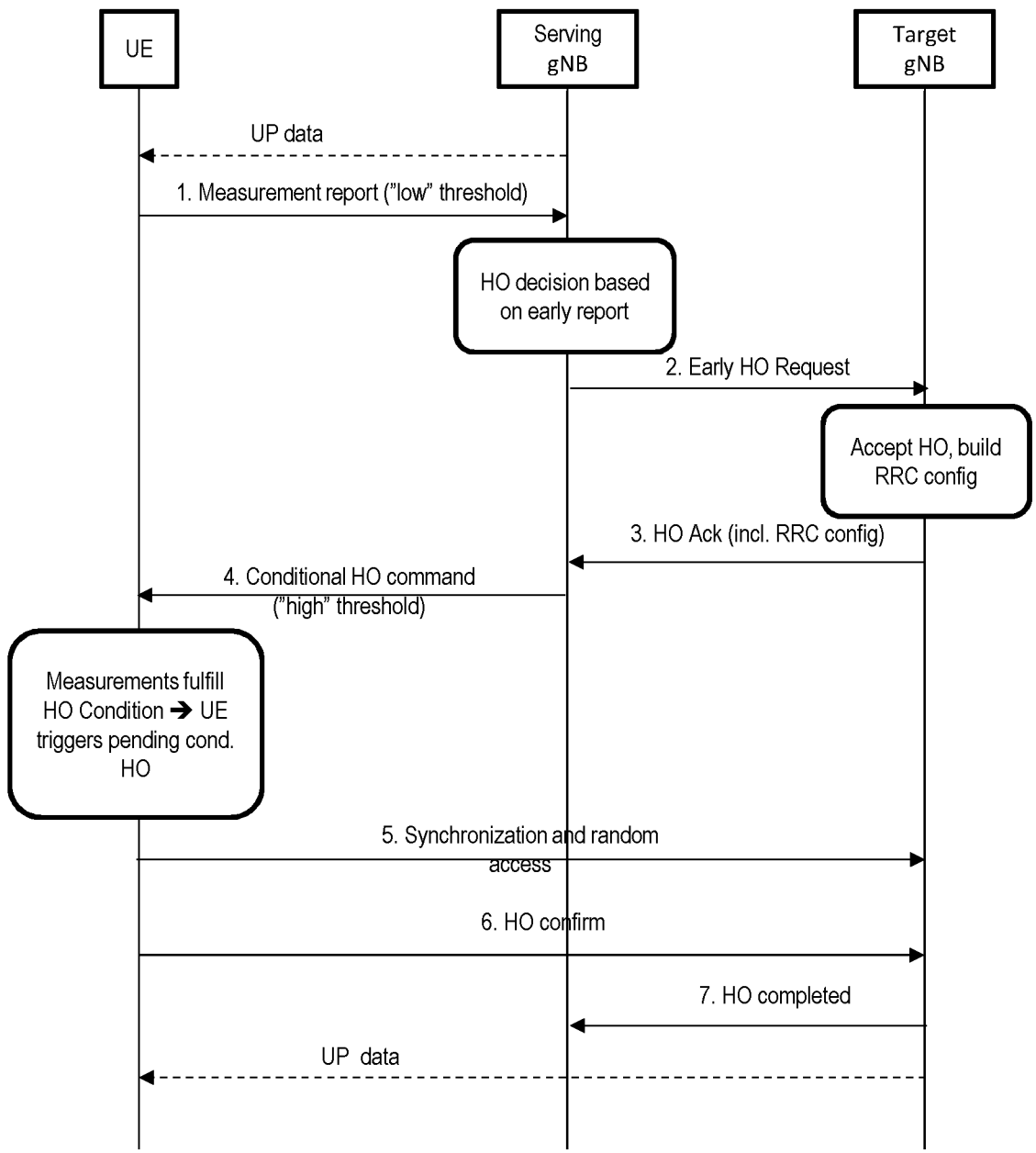
FIG. 2 is a schematic sequence diagram illustrating prior art.
Figure 3A:
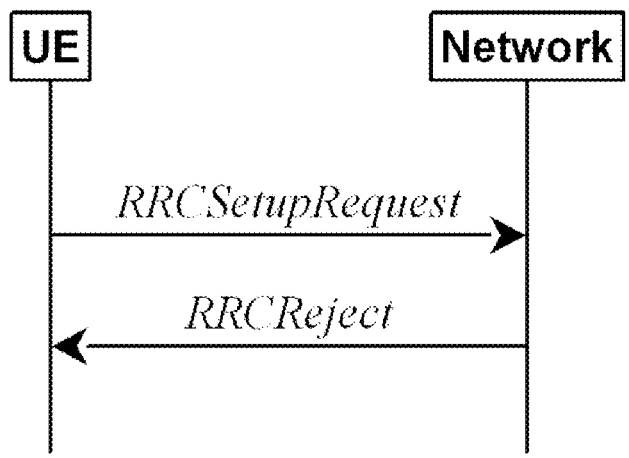
FIGS. 3a and b are a schematic sequence diagrams illustrating prior art.
Figure 3B:
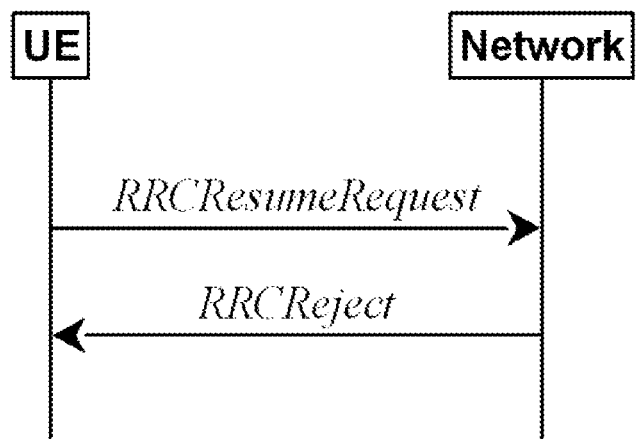
Figure 5:
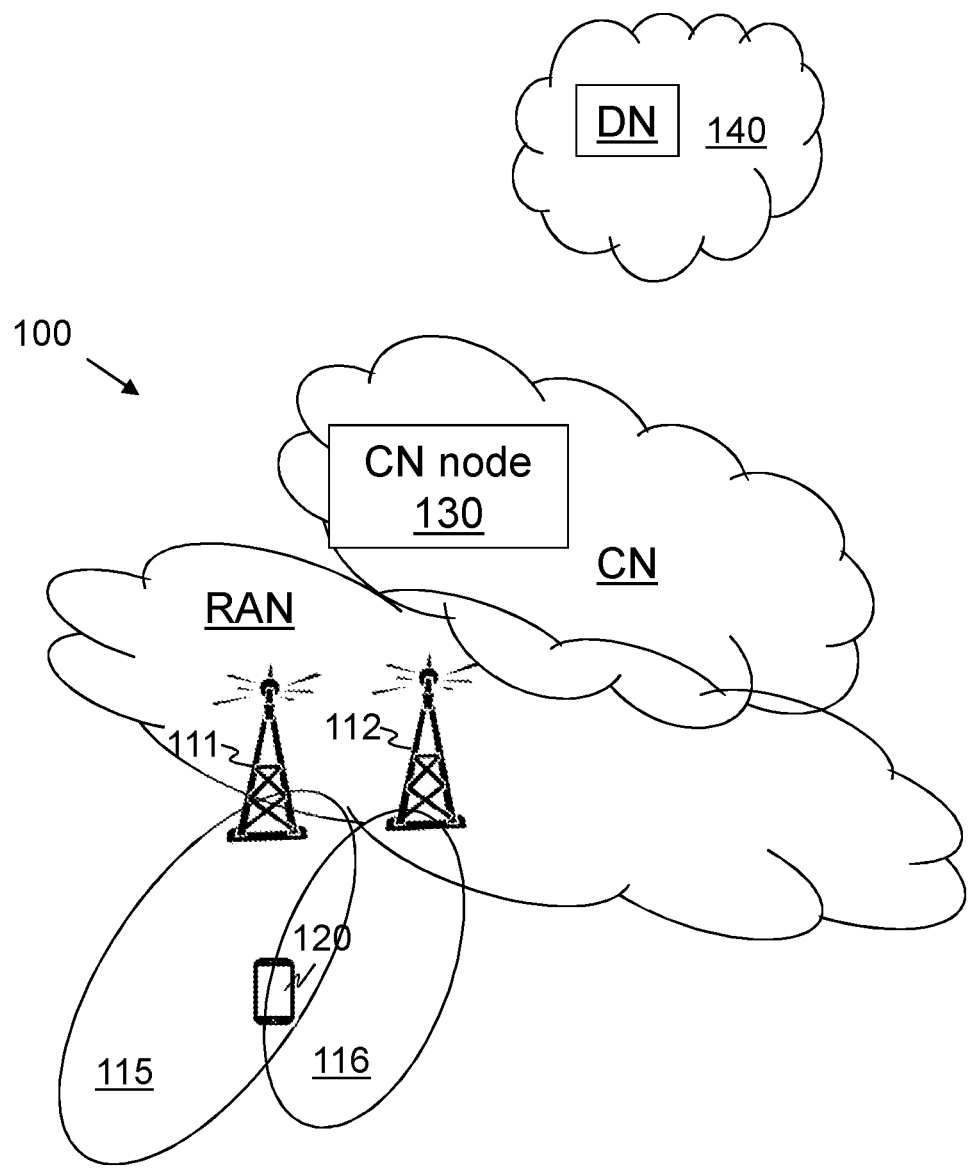
FIG. 5 is a schematic block diagram illustrating embodiments of a wireless communications network.

The basic flows are depicted in FIGS. 3a and b, as in TS 38.331:

FIG. 3a shows FIG. 5.3.3.1-2: RRC connection establishment, network reject as in TS 38.331.

FIG. 3ab FIG. 5.3.13.1-5: RRC connection resume, network reject, as in TS 38.331.

The use case for introducing an RRCReject message comes from LTE and is basically when the network is overloaded. The alternative would have been to use access control mechanisms, which relies on broadcasted information in system information. However, RRCReject is an alternative relying on dedicated signalling for more dynamic load changes in the system for UEs coming from RRC_IDLE or RRC_INACTIVE.

The existing solutions referred to are the conventional handover procedure and the solution proposed in a recent contribution to RAN2#103bis in Chengdu (October 2018), and later resubmitted in RAN2#104 Spokane (R2-1816691).

In the conventional handover/mobility procedure, the inter-node messages between source and neighbour network nodes may either be inter-node RRC and/or X2/Xn messages, as described above. A problem of existing solution is that in conditional handover, the source network node requests the target network node to prepare a conditional handover message. When a target node prepares that message the target network node needs to reserve certain amount of resources such as C-RNTI, RACH (in case of contention free RACH is configured), make sure the services and/or bearers the UE is running are supported in target with a minimum QoS, etc.

It is a problem that time-wise, the target network node does not really know when the UE is fulfilling the condition that will actually trigger the handover. In addition to that, it is not even certain that the UE is actually going to a particular target network node, as conditional handover may support the configuration of multiple target cell candidates possibly from multiple target nodes.

As the load and overall conditions in a mobile network, such as a wireless communications network, are quite volatile, the load and overall conditions may be very different at the time a given node that is a potential target for conditional handover accepts a request from a source network node, and the time the UE actually performs the access.

To counter-act that problem, an alternative has been proposed in a recent contribution to RAN2 (R2-1816691). The authors propose to configure the UE with a timer in the conditional handover message to indicate how long the dedicated RACH resource allocated by target can be valid. First of all, that solution only focuses on the RACH validity. Then, their solution has the assumption that the target node is capable of predicting for how long the UL load for RACH is acceptable so that the UE may have dedicated resources reserved to it.

It may be argued that timer T304 configured by the target cell 116 in NR and LTE networks in handovers and SCG addition, indicates some kind of validity time for the resources in target. However, the order of magnitude of these timers are quite short and they are set to capture the assumption the load remains similar over time, but rather a time to allow the UE to properly finalize the handover.

An object of embodiments herein is to improve the performance of a wireless communications network using handover.

Some example of embodiments herein relate to a rejection on handover complete, e.g. within the technical fields of Mobility enhancements; 5G; NR; mobility robustness; conditional handover; and RRC reject.

Figure 4:
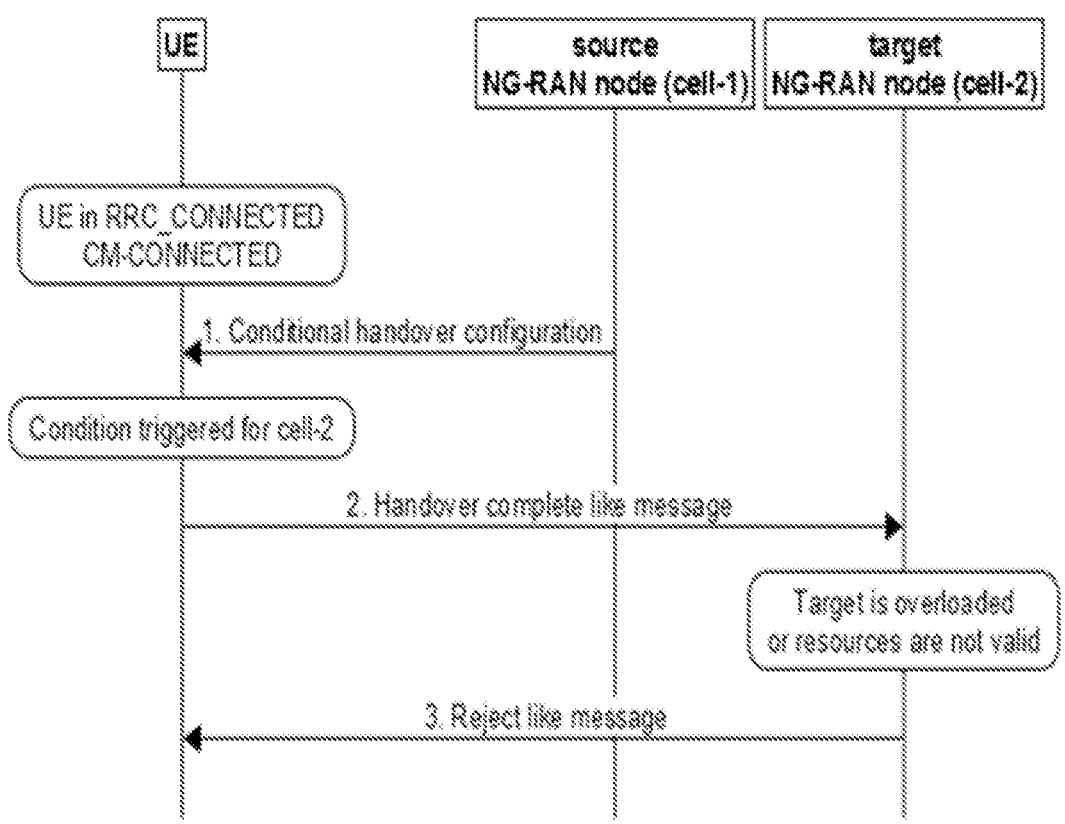
FIG. 4 is a schematic sequence diagram illustrating embodiments of a method.

FIG. 4 depicts an example of a method executed by a UE 120 for network protection during mobility, e.g. conditional handover, according to embodiments herein. The UE 120 is in this example, in RRC_CONNECTED CM-CONNECTED mode. The method e.g. comprises:

1. The UE 120 receives a conditional handover configuration also referred to as conditional mobility configuration from a source network node 111 referred to as source NG-RAN node (cell1) in FIG. 4. When receiving the conditional handover configuration, the UE 120 starts to monitor a condition. This relates to Action 600 described below.

2. The UE 120 sends a first message such as a handover complete like message, also referred to as handover command complete like message to a target network node 112 referred to as target NG-RAN node (cell 2) in FIG. 4 e.g. the target cell 116, fulfilling the condition from the previous step. This is performed when the condition is fulfilled for the target cell 116 referred to as cell-2 in FIG. 4. This relates to Action 601 described below.

3. According to embodiments herein, the UE 120 receives in response to the handover command complete like message a second message, such as a reject like message that protects the target cell 116 to be accessed by the UE e.g. when it becomes overloaded. This relates to Action 602 described below.

The UE 120 may then perform actions upon the reception of the rejection message such as not accessing the target cell 116 for a configured time and indicating the occurrence of the event to the source network node.

Some advantages of embodiments provided herein may comprise.

A neighbour network node may accept a conditional handover for a UE, such as the UE 120, based on an existing situation e.g. in terms of DL load, UL load, QoS guarantees, number of UEs supporting a certain required latency, etc., and upon the execution, which may take some time after the configuration is provided, be able to reject the UE in case the previous conditions do not apply any longer. And, in response, the UE may apply actions upon such as performing the appropriated state transition, e.g. from RRC_CONNECTED to RRC_IDLE, and/or informing upper layers of a failure or transition, and/or starting a wait time, etc.

Embodiments herein relate to wireless communication networks in general. FIG. 5 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Network nodes operate in the wireless communications network 100 such as a source network node 111 and a target network node 112. The source network node 111 provides radio coverage over a geographical area, a service area referred to as a source cell 115, which may also be referred to as a beam or a beam group of a first radio access technology (RAT), such as 5G, LTE, Wi-Fi or similar. The target network node 112 also provides radio coverage over a geographical area, a service area referred to as a target cell 116, which may also be referred to as a beam or a beam group of a first radio access technology (RAT), such as 5G, LTE, Wi-Fi or similar. The first and second network nodes 111, 112 may each be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area served by the respective source and target network node 111, 112 depending e.g. on the first radio access technology and terminology used. The respective source and target network node 111, 112 may be referred to as serving radio access nodes and communicates with a UE with Downlink (DL) transmissions to the UE and Uplink (UL) transmissions from the UE. According to an example scenario of embodiments herein, a UE 120 is preparing a handover from the source network node 111 to the target network node 112.

A number of UEs operate in the wireless communication network 100, such as the UE 120. The UE 120 may be a mobile station, a non-access point (non-AP) STA, a STA, a user equipment and/or a wireless terminals, that communicate via one or more Access Networks (AN), e.g. RAN, e.g. via the source and/or target network nodes 111, 112 to one or more core networks (CN), e.g. comprising CN node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may in an aspect be performed by a network node such as the source network node 111 or the target network node 112, and in a second aspect by the UE 120. As an alternative, a Distributed Node (DN) and functionality, e.g. comprised in a cloud 140 as shown in FIG. 5, may be used for performing or partly performing the methods.

It should be noted that the wordings "first message" and "second message" when used herein, have nothing to do with order of the messages. They are just "names" of the messages, simply used to be able to differentiate them from each other.

Figure 6:
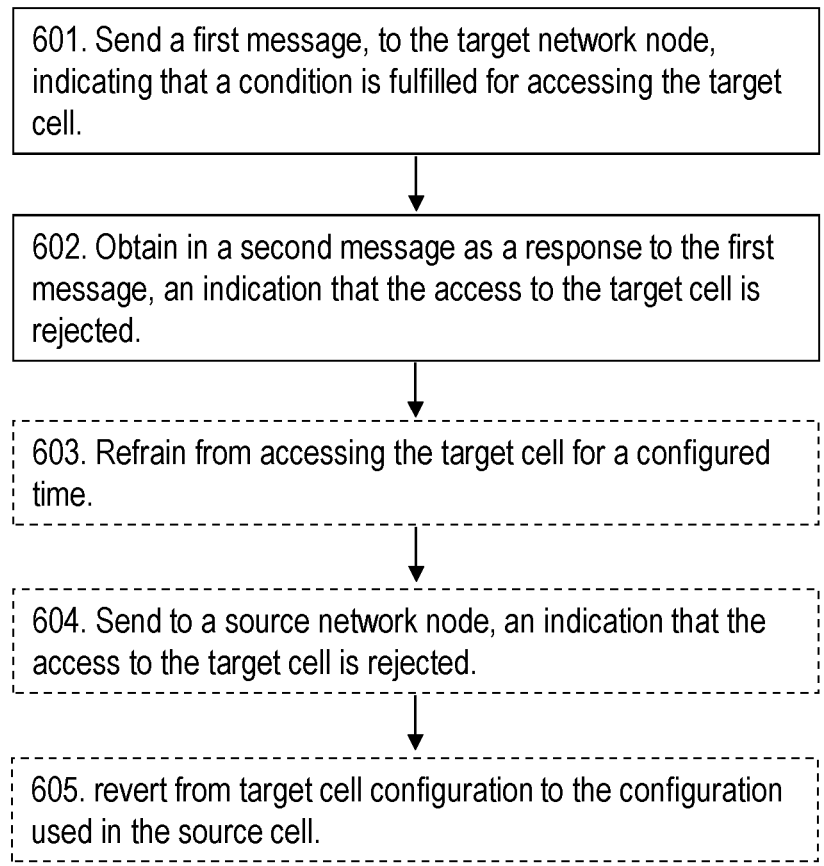
FIG. 6 is a flowchart depicting embodiments of a method in a UE.

FIG. 6 shows an example embodiment of a method performed by the UE 120, whereof only some of the actions are described below. The method may be for protecting a target network node 112 e.g. during reconfiguration with synchronisation and/or during handover, e.g. conditional handover, or access, of the UE 120 to the target cell 116 served by the target network node 112, in a wireless communications network 100. A source network node 111 and the target network node 112 may be the same cell serving both source cell 115 and the target cell 116.

According to an example scenario, the UE 120 is served in the source cell 115 and moves towards the target cell 116. The UE 120 is engaged in an ongoing communication with the wireless communication network 100 in the source cell 115 and a handover to the target cell 116 is needed.

According to another example scenario, the UE 120 is served in the source cell 115 and wants to add some further resources provided in target cell 116.

The method comprises one or more of the following actions, which actions may be taken in any suitable order:

When a condition the target cell 116 is fulfilled, the UE 120 sends a first message in Action 601. The first message indicates that the condition for the target cell 116 is fulfilled.

The condition being fulfilled may e.g. mean that a condition for handover is fulfilled for the target cell 116, e.g. a mobility condition.

In some embodiments, the first message may be sent as an access control check e.g. to the target network node 112.

In some other embodiments, the first message may be sent to the target network node 112. The first message may e.g. be a handover command complete message, such as a RRCReconfigurationComplete message, in NR for example or an RRCConnectionReconfigurationComplete message in LTE.

In Action 602, the UE 120 obtains e.g. from the target network node 112, as a 20 response to the first message, an indication that the handover to the target cell 116 is rejected.

The indication protects the target cell 116 to be accessed by the UE 120, e.g. when it becomes overloaded. This may e.g. be a reject like message.

This may in some embodiments be a response to the first message as an access control check, wherein the target cell 112 is barred.

In some embodiments, the UE 120 refrains from accessing the target cell 116 for a configured time in Action 603, and in some of these embodiments, the indication that the handover to the target cell 116 is rejected is comprised in a message further comprising the configured time.

According to some similar embodiments which may be combined with the embodiments above, the method is performed by the UE 120, e.g. for protecting a target cell 116 served by a target network node 112, from being accessed by the UE 120 in a wireless communications network 100. The UE 120 is e.g. connected to one or more source cells 115. The UE 120 may be connected to one or more source cells 115.

Action 601

When a condition is fulfilled for accessing the target cell 116, the UE 120 sends a first message to the target network node 112. The first message indicates that the condition is fulfilled for accessing the UE 120 to the target cell 116. It should be noted that the wordings "sending the first message" and "transmitting the first message" have the same meaning and may be used interchangeably herein.

Action 602

The UE 120 obtains e.g. from the target network node 112, e.g. in a second message as a response to the first message, an indication that the access to the target cell 116 is rejected. The indication protects the target cell 116 to be accessed by the UE 120, e.g. when it becomes overloaded. It should be noted that the wordings "obtaining the indication" and "receiving the indication" have the same meaning and may be used interchangeably herein.

The access of the UE 120 to the target cell 116 may e.g. relate to any one out of:
A handover of the UE 120 to the target cell 116,
a conditional handover of the UE 120 to the target cell 116,
the UE 120 connected to more than one source cells 115 wherein a handover of the UE 120 from at least one of the source cells 115 to the target cell 116 is triggered,
the UE 120 connected to the source cell 115 additionally accesses to the target cell (116), e.g. dual connectivity, carrier aggregation, and
an SCG change.

Action 603

In some embodiments, the UE 120 refrains from accessing the target cell 116 for a configured time, such as e.g. the configured amount of time.

The indication that the access to the target cell 116 is rejected may be comprised in a message further comprising the configured time.

Action 604

In some embodiments, the UE 120 sends to a source network node 111, an indication that the access to the target cell 116 is rejected.

Action 605

In some embodiments, the UE 120 reverts from a target cell 116 configuration to the configuration used in the source cell 115, e.g. including the security configuration.

Figure 7:
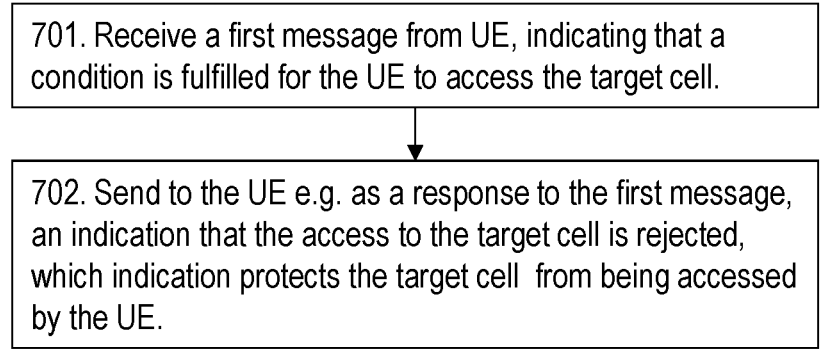
FIG. 7 is a flowchart depicting embodiments of a method in a target network node.

FIG. 7 shows an example method performed by the target network node 112, e.g. for protecting a target cell 116 served by the target network node 112, from being accessed by the UE 120 in a wireless communications network 100. The UE 120 may be connected to one or more source cells 115. The UE 120 may be connected to one or more source cells 115.

The method comprises one or more of the following actions performed in any suitable order:

Action 701

The target network node 112 receives a first message from the UE 120, which first message indicates that a condition is fulfilled for the UE 120 to access the target cell 116.

Action 702

The target network node 112 sends an indication to the UE 120 e.g. in a second message as a response to the first message. The indication indicates that that the access to the target cell 116 is rejected. The indication protects the target cell 116 from being accessed by the UE 120, e.g. when it becomes overloaded.

The indication that the access to the target cell 116 is rejected may be comprised in a second message further comprising a configured time, such as e.g. the configured amount of time, during which configured time the UE 120 shall refrain from accessing the target cell 116.

The access of the UE 120 to the target cell 116 may relates to any one out of:
a handover of the UE 120 to the target cell 116
a conditional handover of the UE 120 to the target cell 116,
the UE 120 connected to more than one source cells 115 wherein a handover of the UE 120 from at least one of the source cells 115 to the target cell 116 is triggered,
the UE 120 connected to a source cell 115 additionally accesses to the target cell 116, e.g. dual connectivity, carrier aggregation.

The indication that the access to the target cell 116 is rejected may be sent when the target cell 116 becomes overloaded.

The indication that the access to the target cell 116 is rejected may be sent in a second message, as a response to the first message.

The embodiments described above will now be explained and exemplified more in detail.

Conditional Mobility

The term "conditional mobility" is used herein to refer to e.g. conditional handover, conditional resume, conditional reconfiguration with sync, conditional reconfiguration. The term should be interpreted fundamentally as any procedure that is configured by network to the UE 120 which contains a condition, e.g. associated to measurement event, and, upon the triggering of that condition the UE 120 shall perform the mobility related procedure e.g. resume, handover, reconfiguration with sync, beam switching, etc.

The method may apply for a conditional mobility configuration associated to a single cell or to multiple cells. In the case of single cell, a single measurement configuration reference is provided and linked to a mobility procedure.

Intra-RAT, Inter-RAT, NR, LTE and Further Disclaimers

Most of the UE 120 and network such as target network node 112 actions herein are described as being performed in NR or LTE. In other words, the configuration of a conditional HO received in NR and executed in NR and, in the context of embodiments herein, rejected by NR. However, the method is also applicable in other cases, such as at least:
The UE 120 is configured with a condition HO in NR, then the condition is triggered and UE 120 executes the HO in LTE and is rejected in LTE.
The UE 120 is configured with a condition HO in LTE, then the condition is triggered and UE 120 executes the HO in NR and is rejected in NR.

Or, in more general terms, the UE 120 is configured with a condition HO in one Radio Access Technology (RAT)-1, then the condition is triggered and UE 120 executes the HO in another RAT, RAT-2 and is rejected in RAT-2.

Most of the UE 120 and network such as target network node 112 actions herein are described in terms of handover or reconfigurations with synchronization, (sync), which may comprise a change of a cell. However, the method also comprises cases where a cell is added, for example in case of multi-connectivity scenarios such as carrier aggregation, dual connectivity, EN-DC, NR-DC, MR-DC, etc. In that case, the configuration of a conditional HO as described herein may be described as a conditional configuration for SCG addition or SCell addition, or equivalent. The method may also comprise the case of intra-cell procedure relying on conditional mobility e.g. a reconfiguration with sync with cell identity the same as a serving cell.

Embodiments herein will now be further explained and exemplified.

Example embodiments herein comprise a method executed by the UE 120 for network protection during conditional mobility, e.g. conditional handover. The method according to an example may comprise:

Receiving 600 from a source network node 111 a conditional mobility configuration, upon which the UE 120 starts to monitor a condition.

Sending 601 a handover command complete like message to a target network node 112, e.g. target cell 116, fulfilling the condition from the previous step.

Handover Command Complete like Message Types

This first message may e.g. be a handover command complete like message. The handover command complete like message may be for example be an RRCReconfigurationComplete message, in NR for example, or an RRCConnectionReconfigurationComplete message in LTE. Those messages are sent on SRB1. The handover command complete like message may then be encrypted, and integrity protected according to the configuration received by the target cell 116, e.g. using the parameters allocated by the target cell 116, such as next hop chaining counter and integrity protection and encryption algorithms. For the figures, the RRCReconfigurationComplete, is simply used as an example.

The example method defines that after sending the handover the first message such as the complete message described above, the UE 120 obtains such as e.g. receives an indication that an access to the target cell 116 is rejected, e.g. in second message such as a reject like message that protects the target cell 116 to be accessed by the UE 120 e.g. when it becomes overloaded.

Message Types for Rejecting the UE 120

Figure 8:
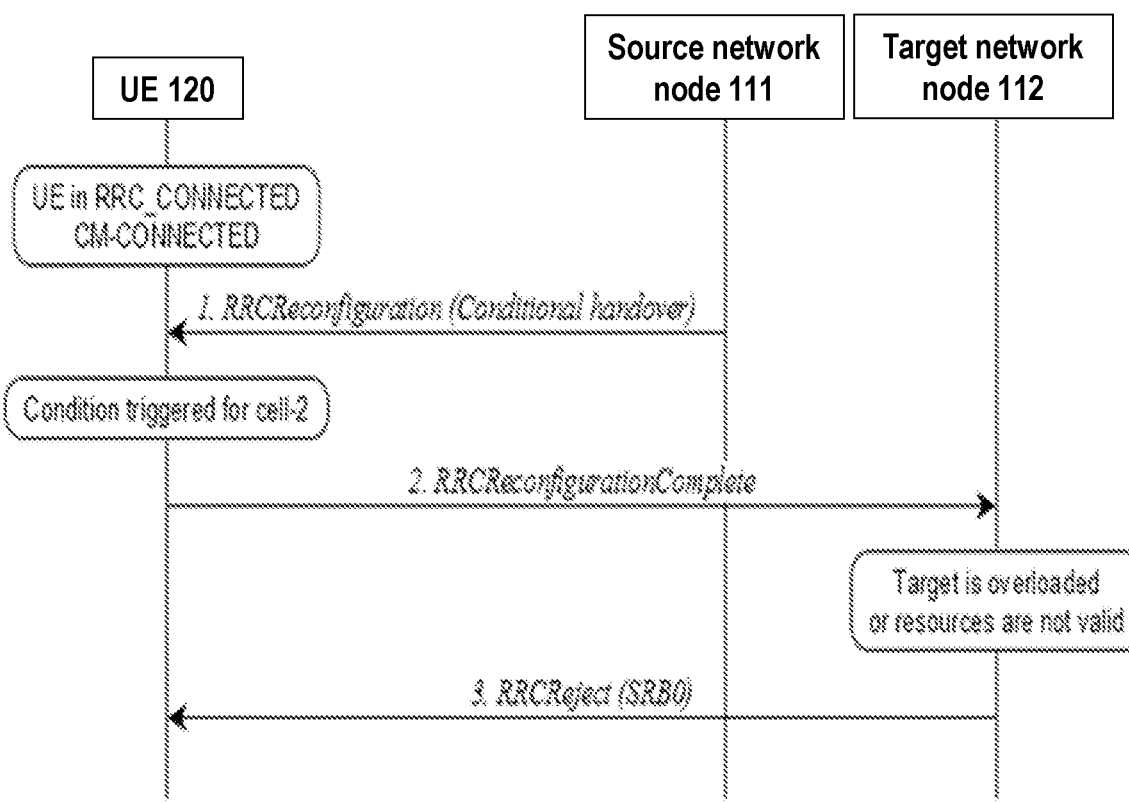
FIG. 8 is a schematic sequence diagram illustrating embodiments of a method.

FIG. 8 depicts some embodiments wherein the message such as e.g. the second message, rejecting the UE 120 after the UE 120 has sent the first message such as e.g. a handover complete like message 2 is an RRCReject message 3 over SRB0. In LTE, the equivalent message would be an RRCConnectionReject message. The fact that the message is sent on SRB0 means that the message is not integrity protected and is not encrypted i.e. a potential target network node 112 that may receive a conditional handover may through away the UE 120 AS context in case it knows it will not accept any UE 120 later due to a change in condition at the network side e.g. overload.

Figure 9:
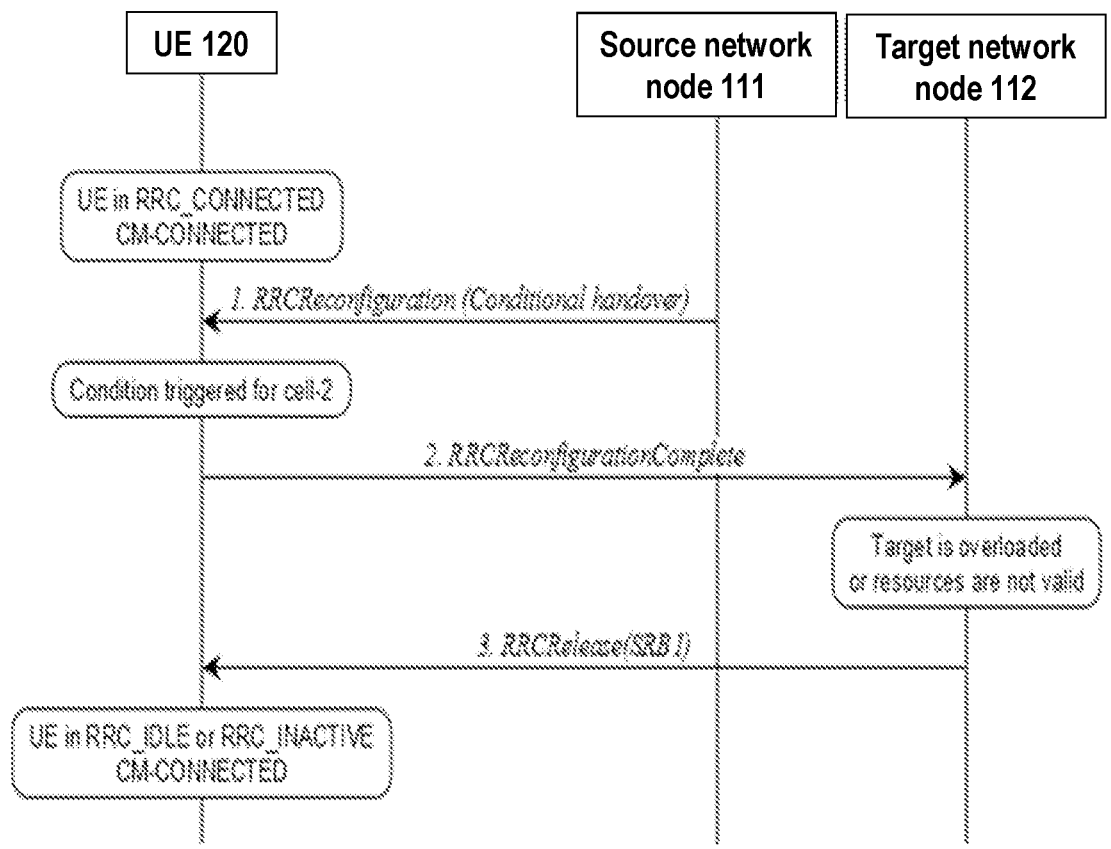
FIG. 9 is a schematic sequence diagram illustrating embodiments of a method.

In some other embodiments as depicted in FIG. 9, the message such as e.g. the second message, rejecting the UE 120 after the UE 120 has sent the first message such as e.g. a handover complete like message 2 is an RRCRelease message 3 over SRB1. In LTE, the equivalent message would be an RRCConnectionRelease message. In that case, the message is integrity protected and encrypted using the same new security keys (integrity protection and encryption keys) according to the configuration provided by target. Then, the UE 120 is certain that it is being rejected by a real network while a fake network may send a message over SRB0.

In some other embodiments, before accessing the target cell 116 and transmitting the first message such as e.g. the RRCReconfigurationComplete message (or equivalent) the UE 120 may perform access control check to verify that the cell is not barred. In that case, network has the possibility to bar a given incoming UE 120 if load conditions have changed. In that solution one may define a new access category for incoming UE 120s for handovers or conditional handover.

Content of the Message Rejecting the UE 120 and Actions Upon Reception

The message, such as e.g. the second message, may comprise different information that lead to different actions at the UE 120 upon its reception.

In some example embodiments, the message, such as e.g. the second message, rejecting the UE 120 after the UE 120 sends a handover complete message such as e.g. the first message, e.g. after a conditional handover is triggered, comprises a wait time value (e.g. an integer from 1 to 16 seconds). Upon the reception of that message with that field the UE 120 may start a timer with that received value, e.g. timer T302. The UE 120 then considers that the target cell 116 that has fulfilled the condition for the conditional handover as barred, and may monitor the timer. While the timer is running the UE 120 is still connected to its source network node 111 in the source cell 115 and, if the UE 120 is reconfigured the timer stops. Upon the expiry of the timer the UE 120 considers whether or not the barring is alleviated. If the barring is alleviated, the UE 120 may access the target cell 116 again which may trigger the transmission of the first message such as the RRCReconfigurationComplete message again. In one variant, the UE 120 only sends the RRCReconfigurationComplete message again if the target cell 116 it was rejected still fulfills the condition for the conditional handover.

The condition may be fulfilled by a reception of a handover comment or e.g. by the fulfilment of the conditional associated to a conditional handover.

In one embodiment related to the wait timer handling in conditional handover, the UE 120 stops the timer upon the transmission of the RRCReconfigurationComplete message such as the first message, e.g. in another cell, if the timer is running. In another variant the UE 120 stops the timer, if it is running, when the UE 120 confirms that it succeeded in executing the handover. This may be done in different manners such as an acknowledgement by a confirmation message from target, and/or by the fact that the UE 120 starts to get scheduled in the target cell 116.

In some embodiments, upon the reception of the second message such as the message rejecting the UE 120 after the UE 120 has sent a handover complete message, such as the first message, e.g. after a conditional handover is triggered, the UE 120 may revert its configuration to the configuration it has been using in the source cell 115, including the security configuration. That implies that upon applying the first message such as the RRCReconfiguration prepared by the target network node 112 upon the triggering of a conditional handover, the UE 120 will not discard the configuration it has with the source cell 115 and/or source network node 111 until the UE 120 confirms the successful completion of the handover with the target cell 116. This may be done in different manners such as e.g. an acknowledgement by a confirmation message from target, and/or by the fact that the UE 120 starts to get scheduled in the target cell 116.

In some other embodiments, the UE 120 starts another timer, e.g. T30X, upon the transmission of the first message, such as the RRCReconfigurationComplete message to the target network node 112. The timer is stopped upon the confirmation from the target network node 112 that the procedure has succeeded. This may be done in different manners such as e.g. an acknowledgement by a confirmation message from target network node 112, and/or by the fact that the UE 120 starts to get scheduled in the target cell 116. Upon the expiry of the timer, the UE 120 considers the whole procedure as a failure. In one variant, the UE 120 goes to RRC_IDLE, performing actions upon such as cleaning up variables, resetting relevant timers, etc. The UE 120 may notify upper layers of the transition from RRC_CONNECTED to RRC_IDLE and the failure. The failure indication to upper layers may be generic (e.g. other) or specific (e.g. 'handover failure' or 'conditional handover failure').

In some other embodiments, upon the reception of the second message such as the message rejecting the UE 120 after the UE 120 has sent the first message, such as a handover complete message, e.g. after a conditional handover is triggered, the UE 120 indicates the occurrence of the rejecting event to the source network node 112 and/or source cell 116, e.g. by transmitting a message, possibly containing information associated such as the target network node 112 that the UE 120 was rejected from (i.e. the target cell 116 fulfilling the conditional handover trigger). This may require that the UE 120 does not disconnect to the source network node 111 until it gets a confirmation from target network node 112 that the procedure was successful. This may be done in different manners such as an acknowledgement by a confirmation message from target network node 112, and/or by the fact that the UE 120 starts to get scheduled in the target cell 116. Upon the reception of that indication the source network node 112 may reconfigure the UE 120, release or suspend the connection the connection, and possibly redirect the UE 120 to another frequency, trigger a handover to another cell and/or another frequency.

In some other embodiments, upon the reception of the second message such as the message rejecting the UE 120 after the UE 120 has sent the first message such as a handover complete message, e.g. after a conditional handover is triggered, the UE 120 considers the whole procedure as a failure. In one variant, the UE 120 goes to RRC_IDLE, and e.g. performs actions upon such as cleaning up variables, resetting relevant timers, etc. The UE 120 may further notify upper layers of the transition from RRC_CONNECTED to RRC_IDLE and the failure. The failure indication to upper layers may be generic (e.g. other) or specific (e.g. 'handover failure' or 'conditional handover failure').

In some other embodiments, upon the reception of the second message, such as the message rejecting the UE 120 after the UE 120 has sent the first message such as the a handover complete message, e.g. after a conditional handover is triggered, the UE 120 may revert back to its old configuration and evaluate whether other candidate cells and/or candidate frequencies fulfill the triggering condition for conditional handover. There may be different rules defines in the standard or configured by the network for this solution, such as:

UE 120 applies the RRCReconfiguration associated to another cell in the same frequency fulfilling the condition. Then, UE 120 sends the RRCReconfigurationComplete to that new cell;

UE 120 applies the RRCReconfiguration associated to another cell in another frequency fulfilling the condition. Then, the UE 120 may send the RRCReconfigurationComplete to that new cell in the other frequency.

In the case the second message such as the message rejecting the UE 120 is an RRCRelease on SRB1, it may contain at least the same information that has been described in the previous embodiments. The advantage though is that it may contain more sensitive information as the message is encrypted and integrity protected.

In the case the second message, such as the message rejecting the UE 120, is an RRCRelease on SRB1 the advantage is that it may contain more sensitive information such as release with redirect information so that instead of simply rejecting the UE 120 the target network node 112 indicates a target frequency the UE 120 shall select after the reception of the message. Then, the UE 120 enters RRC_IDLE, if suspend configuration is not present, or RRC_INACTIVE, if suspend configuration is present, and perform Non-Access-Stratum (NAS) recovery.

In some other embodiments, after being rejected as described above the UE 120 performs an access control check by reading system information, before accessing again, so the network is protected. That may be done in the source and/or target network node 111, 112.

For the cases the reception of the second message such as the, RRCReject in response to the first message such as a handover complete in target network node 112 is considered as a failure, as described in previous embodiments, the UE 120 may log relevant information in a failure report.

Possible Implementation in the NR RRC Specifications

Reception of the Second Message, such as the RRCReject by the UE 120

The UE 120 shall:
1>stop timer T300, if running;
1>stop timer T319, if running;
1>stop timer T302, if running;
1>reset MAC;
1>if waitTime is configured in the RRCReject:
   2>start timer T302, with the timer value set to the waitTime;
1>if RRCReject is received in response to a request from upper layers:
   2>release the MAC configuration;
   2>inform the upper layer that access barring is applicable for all access categories except categories '0' and '2';
1>if RRCReject is received in response to a RRCReconfigurationComplete:
   2>consider barred the cell the UE transmitted the RRCReconfigurationComplete;
   2>revert back to the UE configuration used in the source PCell;
1>else if RRCReject is received in response to an RRCSetupRequest:
   2>inform upper layers about the failure to setup the RRC connection, upon which the procedure ends;

1>if RRCReject is received in response to an RRCReconfigurationComplete, RRCResumeRequest or an RRCResumeRequest1:
  2>if resume request that is rejected is triggered by upper layers:
    3>inform upper layers about the failure to resume the RRC connection;
  2>if resume request that is rejected is triggered by RRC:
    3>set the variable pendingRnaUpdate to 'TRUE';
  2>discard the $K_{gNB}$, the $K_{RRCenc}$ key, the $K_{RRCint}$, the $K_{UPint}$ key and the $K_{UPenc}$ key derived in accordance with in 3GPP TS 38.331 5.3.13.3;
  2>suspend SRB1, upon which the procedure ends;

The RRC_INACTIVE UE 120 shall continue to monitor paging while the timer T302 is running, except in the case the UE is rejected after transmitting the first message such as an RRCReconfigurationComplete message (as the UE is in RRC_CONNECTED).

Reception of an RRCReconfiguration (Conditional Handover) by the UE 120

The UE 120 shall perform the following actions upon reception of the RRCReconfiguration:
1>stop timer T302, if running;
1>if the RRCReconfiguration includes the fullConfig:
  2>perform the radio configuration procedure as specified in
    3GPP TS 38.331 5.3.5.11;
1>if the RRCReconfiguration includes the masterCellGroup:
  2>perform the cell group configuration for the received masterCellGroup according to 3GPP TS 38.331 5.3.5.5;
1>if the RRCReconfiguration includes the masterKeyUpdate:
  2>perform security key update procedure as specified in 3GPP TS 38.331 5.3.5.7;
1>if the RRCReconfiguration includes the secondaryCellGroup:
  2>perform the cell group configuration for the SCG according to 3GPP TS 38.331 5.3.5.5;
1>if the RRCReconfiguration message contains the radioBearerConfig:
  2>perform the radio bearer configuration according to 3GPP TS 38.331 5.3.5.6;
1>if the RRCReconfiguration message includes the measConfig:
  2>perform the measurement configuration procedure as specified in 3GPP TS 38.331 5.5.2;
1>if the RRCReconfiguration message includes the dedicatedSIB1-Delivery:
  2>perform the action upon reception of SIB1 as specified in 3GPP TS 38.331 5.2.2.4.2;
1>if the RRCReconfiguration message includes the dedicatedSystemInformationDelivery:
  2>perform the action upon reception of System Information as specified in 3GPP TS 38.331 5.2.2.4;
1>set the content of RRCReconfigurationComplete message as follows:
  2>if the RRCReconfiguration includes the masterCellGroup containing the reportUplinkTxDirectCurrent, or;
  2>if the RRCReconfiguration includes the secondaryCellGroup containing the reportUplinkTxDirectCurrent:
    3>include the uplinkTxDirectCurrentList;
1>if the UE is configured with E-UTRA nr-SecondaryCellGroupConfig (MCG is E-UTRA):
  2>if RRCReconfiguration was received via SRB1:
    3>submit the RRCReconfigurationComplete via the EUTRA MCG embedded in E-UTRA RRC message RRCConnection ReconfigurationComplete as specified in TS 36.331 [10];
    3>if reconfigurationWithSync was included in spCellConfig of an SCG:
      4>initiate the random access procedure on the SpCell, as specified in 3GPP TS 38.321;
    3>else:
      4>the procedure ends;
  NOTE: The order the UE such as the UE 120 sends the RRCConnectionReconfigurationComplete message and performs the Random Access procedure towards the SCG is left to UE implementation.
  2>else (RRCReconfiguration was received via SRB3):
    3>submit the RRCReconfigurationComplete message via SRB3 to lower layers for transmission using the new configuration;
  NOTE: For EN-DC, in the case RRCReconfiguration is received via SRB1, the random access is triggered by RRC layer itself as there is not necessarily other UL transmission. In the case RRCReconfiguration is received via SRB3, the random access is triggered by the MAC layer due to arrival of RRCReconfigurationComplete.
1>else:
  2>submit the RRCReconfigurationComplete message via SRB1 to lower layers for transmission using the new configuration;
  2>if this is the first RRCReconfiguration message after successful completion of the RRC re-establishment procedure:
    3>resume SRB2 and DRBs that are suspended;
1>if reconfigurationWithSync was included in spCellConfig of an MCG or SCG, and when MAC of an NR cell group successfully completes a random access procedure;
  2>stop timer T304 for that cell group;
  2>apply the parts of the CQI reporting configuration, the scheduling request configuration and the sounding RS configuration that do not require the UE to know the SFN of the respective target SpCell, if any;
  2>apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;
  2>if the reconfigurationWithSync was included in spCellConfig of an MCG:
    3>stop timer T390, if running, for all access categories;
    3>if RRCReconfiguration does not include dedicatedSIB1-Delivery and
    3>if the active downlink BWP, which is indicated by the firstActiveDownlinkBWP-Id for the target SpCell of the MCG, has a common search space configured by searchSpaceSIB1:
      4>acquire the SIB1 of the target SpCell of the MCG, as specified in 3GPP TS 38.331 5.2.2.3.1 which is scheduled as specified in TS 38.213;
      4>upon acquiring SIB1, perform the actions specified in 3GPP TS 38.331 section 5.2.2.4.2.
  2>the procedure ends.

NOTE: The UE such as the UE 120 is only required to acquire broadcasted SIB1 if the UE can acquire it without disrupting unicast data reception, i.e. the broadcast and unicast beams are quasi co-located.

Embodiments herein provide to receiving an RRCReject message from a target node and perform actions upon after transmitting to that target node an RRCReconfiguration-Complete message, or an equivalent message indicating the handover completion, e.g. upon the triggering of a conditional handover.

Figure 10A:
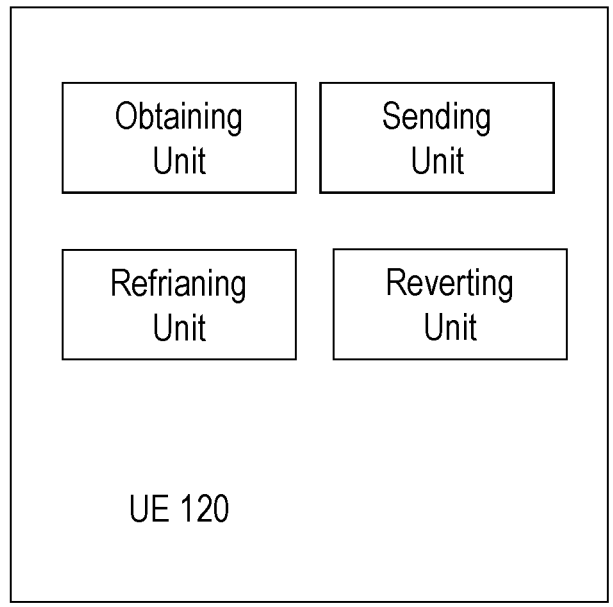
FIGS. 10a and b are schematic block diagrams illustrating an embodiment of a UE.
Figure 11A:
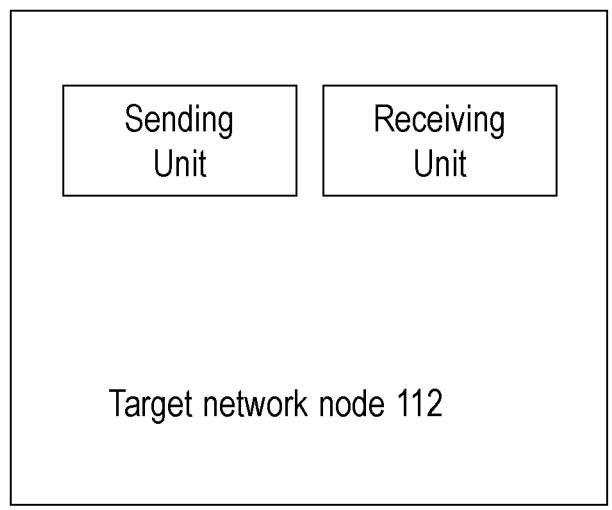
FIGS. 11a and b are schematic block diagrams illustrating an embodiment of a target network node.

FIGS. 10*a* and *b* shows an example of the UE 120 comprising an obtaining unit, a sending unit, a refraining unit and a reverting unit, and FIGS. 11*a* and *b* shows an example of the target network node 112 comprising a sending unit and a receiving unit.

Figure 10B:
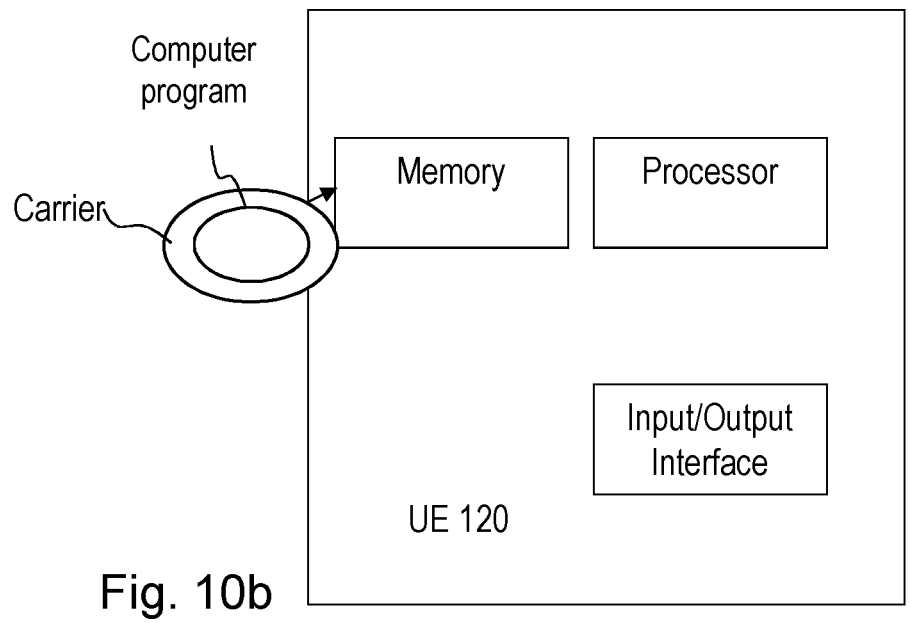
Figure 11B:
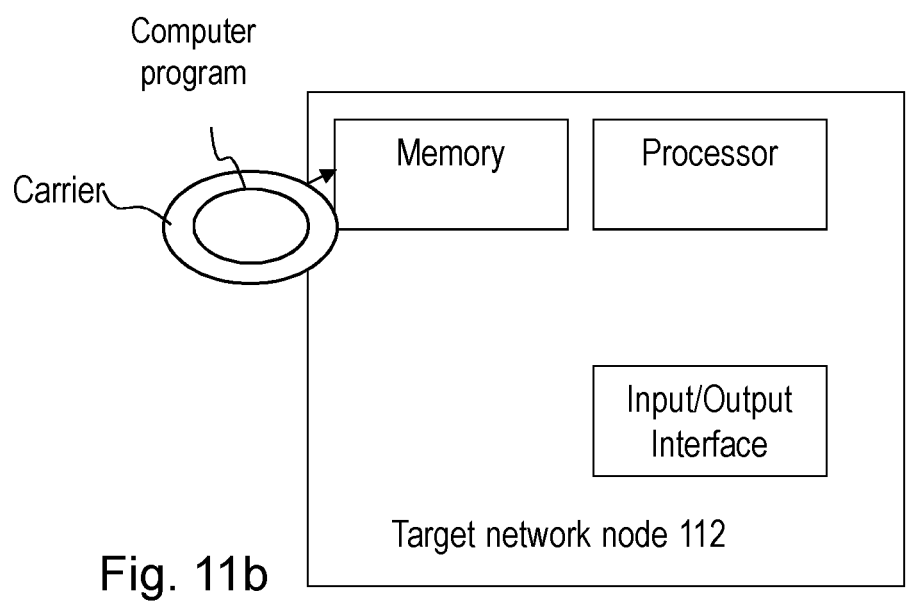

The UE 120 and the target network node 112 may comprise a respective input and output interface configured to communicate with each other, see FIGS. 10*b* and 11*b*. The input and output interface may comprise a wireless receiver (not shown) and a wireless transmitter (not shown).

The embodiments herein may be implemented through a respective processor or one or more processors, such as the processor of a processing circuitry in the UE 120 and the target network node 112 depicted in FIGS. 10*b* and 11*b* together with computer program code for performing the functions and actions of the embodiments herein. The program code mentioned above may also be provided as a computer program product, for instance in the form of a data carrier carrying computer program code for performing the embodiments herein when being loaded into the UE 120 and the target network node 112. One such carrier may be in the form of a CD ROM disc. It is however feasible with other data carriers such as a memory stick. The computer program code may furthermore be provided as pure program code on a server and downloaded to the UE 120 and the target network node 112.

The UE 120 and the target network node 112 may further comprise respective a memory comprising one or more memory units. The memory comprises instructions executable by the processor in the UE 120 and the target network node 112.

The memory is arranged to be used to store e.g. information, data, configurations, and applications to perform the methods herein when being executed in the UE 120 and the target network node 112.

In some embodiments, a respective computer program comprises instructions, which when executed by the at least one processor, cause the at least one processor of the UE 120 and the target network node 112 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the UE 120 and the target network node 112, described above may refer to a combination of analog and digital circuits, and/or one or more processors configured with software and/or firmware, e.g. stored in the UE 120 and the target network node 112, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-20 are described below. The following embodiments refer among other things to FIG. 5, FIG. 6, FIG. 7, FIG. 10*a,b* and FIG. 11*a,b*.

Embodiment 1. A method performed by a User Equipment, UE, 120, e.g. for protecting a target cell 116 served by a target network node 112, from being accessed by the UE 120 in a wireless communications network 100, wherein the UE 120 is connected to one or more source cells 115, the method comprising:

when a condition is fulfilled for accessing the target cell 116, sending 601 a first message, to the target network node 112, which first message indicates that the condition is fulfilled for accessing the target cell 116, obtaining 602 e.g. from the target network node 112 in a second message as a response to the first message, an indication that the access to the target cell 116 is rejected, which indication protects the target cell 116 to be accessed by the UE 120, e.g. when it becomes overloaded.

Embodiment 2. The method according to embodiment 1, further comprising any one or more out of:

refraining 603 from accessing the target cell 116 for a configured time, and wherein the indication that the access to the target cell 116 is rejected is comprised in a message further comprising the configured time.

Embodiment 3. The method according to any of the embodiments 1-2, further comprising:

sending 604 to a source network node 111, an indication that the access to the target cell 116 is rejected.

Embodiment 4. The method according to any of the embodiments 1-3, further comprising any one or more out of:

reverting 605 from a target cell 116 configuration to the configuration used in the source cell 115, e.g. including the security configuration.

Embodiment 5. The method according to any of the embodiments 1-4, wherein the access of the UE 120 to the target cell 116 relates to any one out of:

a handover of the UE 120 to the target cell 116 a conditional handover of the UE 120 to the target cell 116, the UE 120 connected to more than one source cells 115 wherein a handover of the UE 120 from at least one of the source cells 115 to the target cell 116 is triggered, the UE 120 connected to the source cell 115 additionally accesses to the target cell 116, e.g. dual connectivity, carrier aggregation.

Embodiment 6. A computer program comprising instructions, which when executed by a processor, causes the processor to perform actions according to any of the embodiments 1-5.

Embodiment 7. A carrier comprising the computer program of embodiment 6, wherein the carrier is one of an electronic signal, an optical signal, an electromagnetic signal, a magnetic signal, an electric signal, a radio signal, a microwave signal, or a computer-readable storage medium.

Embodiment 8. A method performed by a target network node 112, e.g. for protecting a target cell 116 served by the target network node 112, from being accessed by a User Equipment, UE, 120 in a wireless communications network 100, wherein the UE 120 is connected to one or more source cells 115, the method comprising:

receiving 701 a first message from the UE 120, which first message indicates that a condition is fulfilled for the UE 120 to access the target cell 116, sending 702 to the UE 120 e.g. in a second message as a response to the first message, an indication that the access to the target cell 116 is rejected, which indication protects the target cell 116 from being accessed by the UE 120, e.g. when it becomes overloaded.

Embodiment 9. The method according to embodiment 8,—wherein the indication that the access to the target cell 116 is rejected is comprised in a second message further comprising a configured time during which configured time the UE 120 shall refrain from accessing the target cell 116.

Embodiment 10. The method according to any of the embodiments 8-9, wherein the access of the UE 120 to the target cell 116 relates to any one out of:

a handover of the UE 120 to the target cell 116 a conditional handover of the UE 120 to the target cell 116, the UE 120 connected to more than one source cells 115 wherein a handover of the UE 120 from at least one of the source cells 115 to the target cell 116 is triggered, the UE 120 connected to the source cell 115 additionally accesses to the target cell 116, e.g. dual connectivity, carrier aggregation.

Embodiment 11. A computer program comprising instructions, which when executed by a processor, causes the processor to perform actions according to any of the embodiments 8-10.

Embodiment 12. A carrier comprising the computer program of embodiment 11, wherein the carrier is one of an electronic signal, an optical signal, an electromagnetic signal, a magnetic signal, an electric signal, a radio signal, a microwave signal, or a computer-readable storage medium.

Embodiment 13. A User Equipment, UE, 120, e.g. for protecting a target cell 116 served by a target network node 112, from being accessed by the UE 120 in a wireless communications network 100, wherein the UE 120 is adapted to be connected to one or more source cells 115, the UE 120 being configured to:

when a condition is fulfilled for accessing the target cell 116, send e.g. by means of a sending unit in the UE 120, a first message, to the target network node 112, which first message is adapted to indicate that the condition is fulfilled for accessing the target cell 116, obtain e.g. by means of a obtaining unit in the UE 120, e.g. from the target network node 112 in a second message as a response to the first message, an indication that the access to the target cell 116 is rejected, which indication is adapted to protect the target cell 116 to be accessed by the UE 120, e.g. when it becomes overloaded.

Embodiment 14. The UE 120 according to embodiment 13, further being configured to:

refrain from accessing the target cell 116 for a configured time, e.g. by means of a refraining unit in the UE 120 and wherein the indication that the access to the target cell 116 is rejected is adapted to be comprised in a message further comprising the configured time.

Embodiment 15. The UE 120 according to any of the embodiments 13-14, further being configured to:

send to a source network node 111, an indication that the access to the target cell 116 is rejected e.g. by means of the sending unit in the UE 120.

Embodiment 16. The UE 120 according to any of the embodiments 13-15, further being configured to:

revert from a target cell 116 configuration to the configuration used in the source cell 115, e.g. including the security configuration, e.g. by means of a referting unit in the UE 120.

Embodiment 17. The UE 120 according to any of the embodiments 13-16, wherein the access of the UE 120 to the target cell 116 is adapted to relate to any one out of:

a handover of the UE 120 to the target cell 116 a conditional handover of the UE 120 to the target cell 116, the UE 120 connected to more than one source cells 115 wherein a handover of the UE 120 from at least one of the source cells 115 to the target cell 116 is triggered, the UE 120 connected to the source cell 115 additionally accesses to the target cell 116, e.g. dual connectivity, carrier aggregation.

Embodiment 18. A target network node 112, e.g. for protecting a target cell 116 served by the target network node 112, from being accessed by a User Equipment, UE, 120 in a wireless communications network 100, wherein the UE 120 is adapted to be connected to one or more source cells 115, the target network node 112 being configured to:

receive a first message from the UE 120, which first message indicates that a condition is fulfilled for the UE 120 to access the target cell 116, e.g. by means of the receiving unit in the target network node 112, send to the UE 120 e.g. in a second message as a response to the first message, an indication that the access to the target cell 116 is rejected, which indication is adapted to protect the target cell 116 from being accessed by the UE 120, e.g. when it becomes overloaded e.g. by means of the sending unit in the target network node 112.

Embodiment 19. The target network node 112 according to embodiment 8, wherein an indication that the access to the target cell 116 is rejected is adapted to be comprised in a second message further comprising a configured time during which configured time the UE 120 shall refrain from accessing the target cell 116.

Embodiment 20. The target network node 112 according to any of the embodiments 8-9, wherein the access of the UE 120 to the target cell 116 is adapted to relate to any one out of:

a handover of the UE 120 to the target cell 116 a conditional handover of the UE 120 to the target cell 116, the UE 120 connected to more than one source cells 115 wherein a handover of the UE 120 from at least one of the source cells 115 to the target cell 116 is triggered, the UE 120 connected to the source cell 115 additionally accesses to the target cell 116, e.g. dual connectivity, carrier aggregation.

Figure 12:
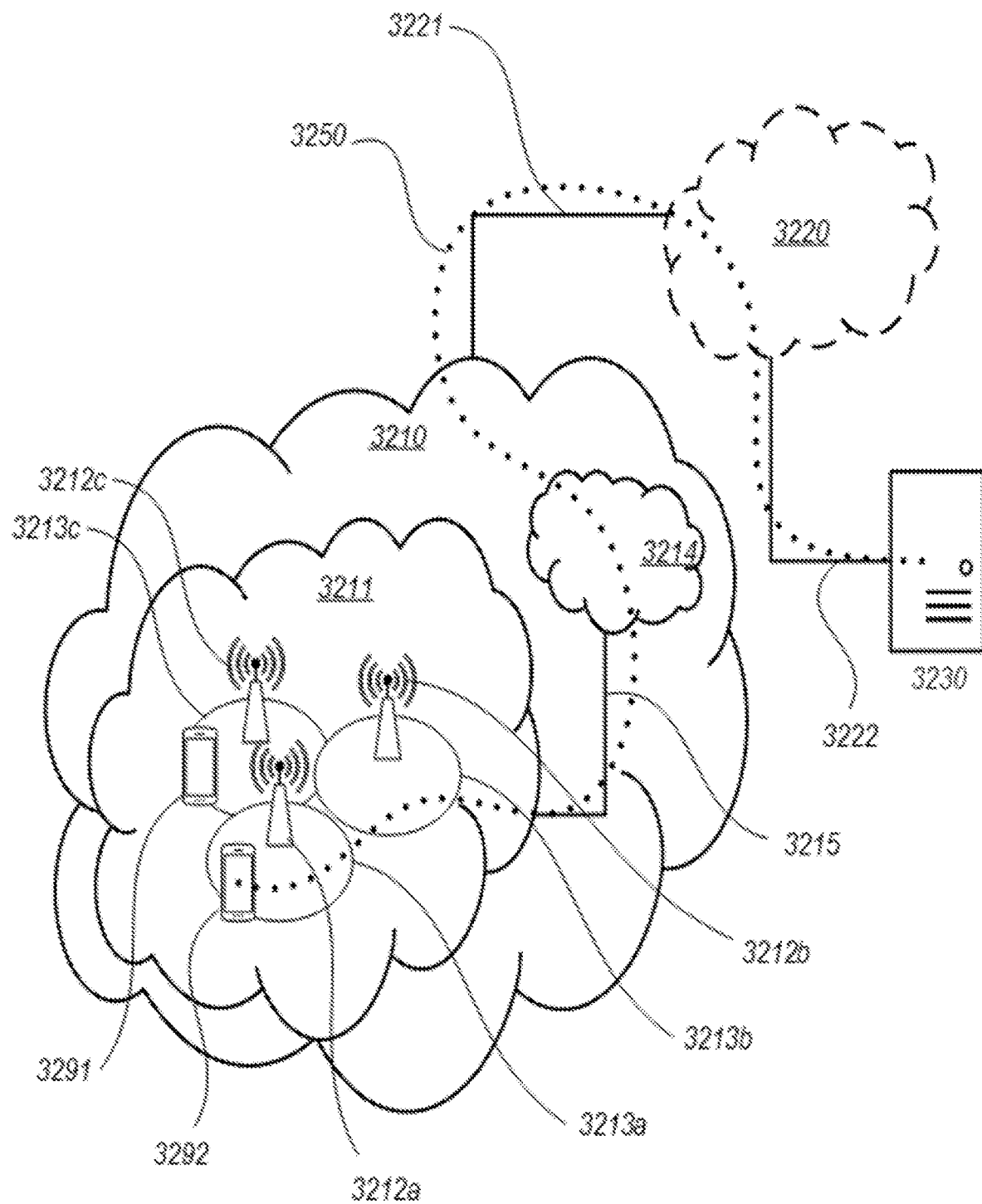
FIG. 12 schematically illustrates a telecommunication network connected via an intermediate network to a host computer.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as the source and target network node 111, 112, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 such as e.g. the UE 120, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
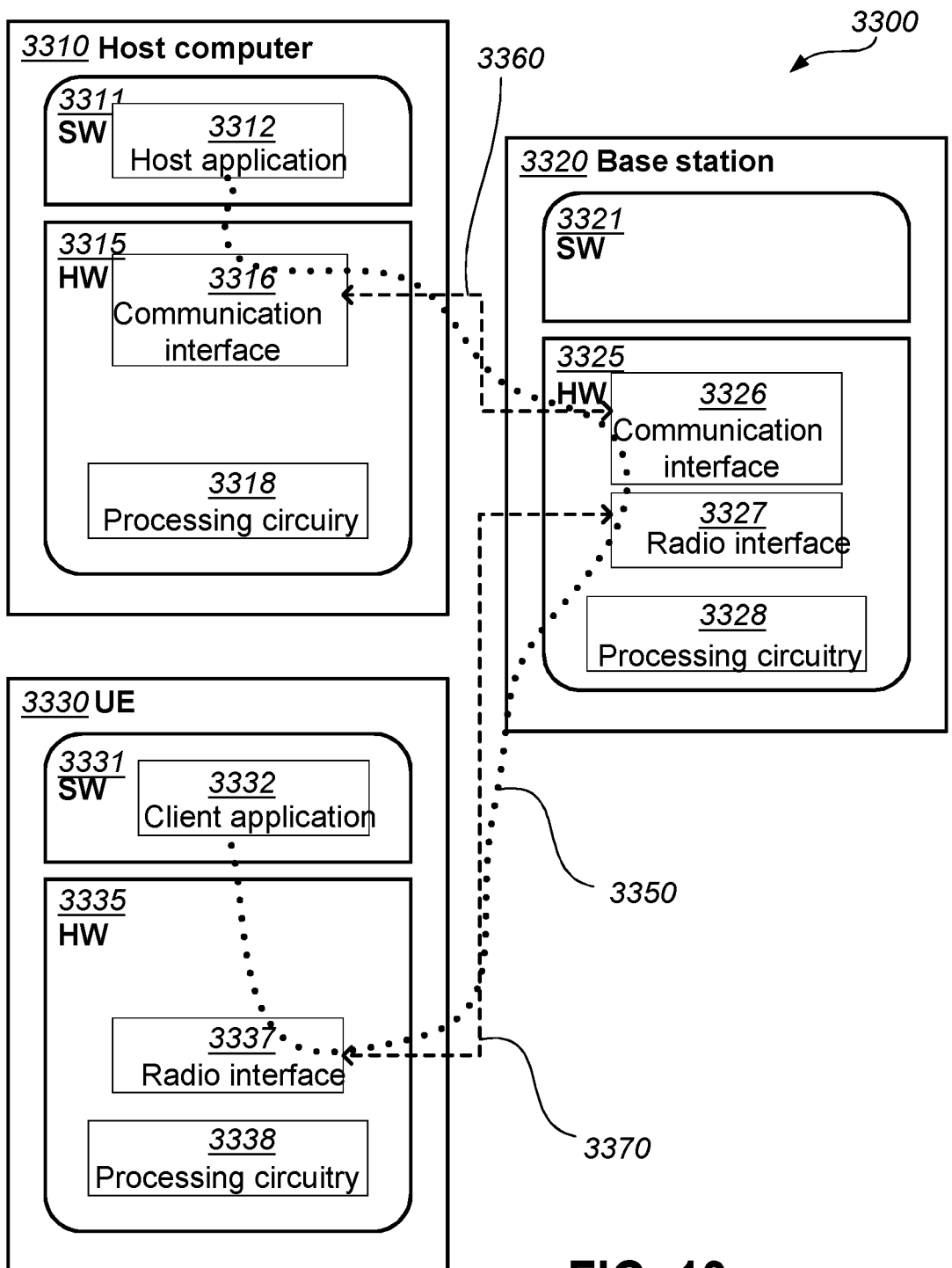
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption, and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 16:
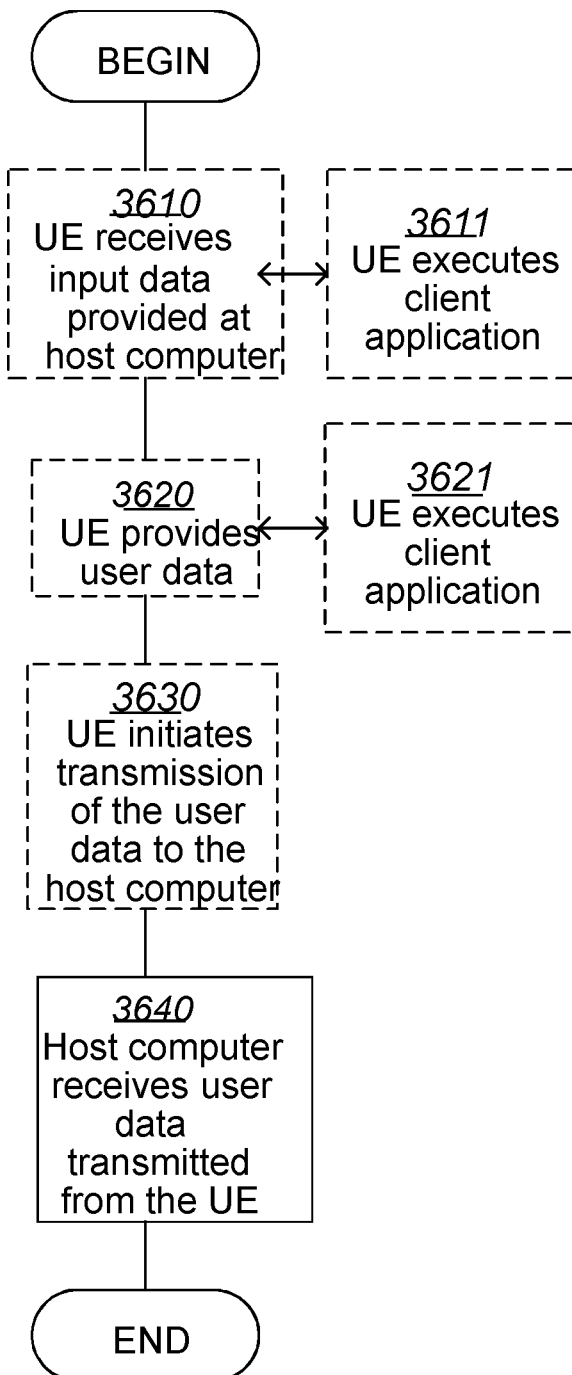

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 17:
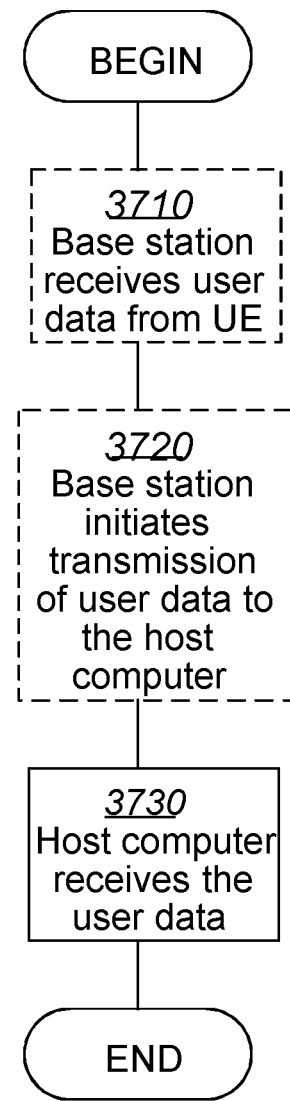

FIG. 17 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a User Equipment, UE, in a wireless communications network, the method comprising:
   when a condition is fulfilled for accessing a target cell, sending a first message to the target network node, which first message indicates that the condition is fulfilled for accessing the target cell, the accessing of the UE to the target cell relating to at least one of the UE being connected to more than one source cells wherein a handover of the UE from at least one of the source cells to the target cell is triggered and the UE being connected to a source cell additionally accesses to the target cell;

obtaining as a response to the first message, an indication that an access to the target cell is rejected, which indication protects the target cell to be accessed by the UE;

refraining from accessing the target cell for a configured time; and the indication that the access to the target cell is rejected is comprised in a message further comprising the configured time.

2. The method according to claim 1, further comprising:
sending to a source network node, an indication that the access to the target cell is rejected.

3. The method according to claim 1, further comprising:
reverting from a target cell configuration to a configuration used in the source cell.

4. The method according to claim 1, wherein the indication that the access to the target cell is rejected, is obtained when the target cell becomes overloaded.

5. The method according to claim 1, wherein the indication that the access to the target cell is rejected, is obtained in a second message, from a second target network node serving the target cell.

6. The method according to claim 1, wherein the UE is connected to one or more source cells.

7. A method performed by a target network node in a wireless communications network, the method comprising:
receiving a first message from a User Equipment, UE, which first message indicates that a condition is fulfilled for the UE to access a target cell served by the target access node, the accessing of the UE to the target cell relating to at least one of the UE being connected to more than one source cells wherein a handover of the UE from at least one of the source cells to the target cell is triggered and the UE being connected to a source cell additionally accesses to the target cell;

sending to the UE an indication that the access to the target cell is rejected, which indication protects the target cell from being accessed by the UE; and the indication that the access to the target cell is rejected is comprised in a second message further comprising a configured time during which configured time the UE shall refrain from accessing the target cell.

8. The method according to claim 7, wherein the indication that the access to the target cell is rejected is sent when the target cell becomes overloaded.

9. The method according to claim 7, wherein the indication that the access to the target cell is rejected, is sent in a second message, as a response to the first message.

10. The method according to claim 7, wherein the UE is connected to one or more source cells.

11. A User Equipment, UE, in a wireless communications network, the UE being configured to:
when a condition is fulfilled for accessing a target cell, send a first message, to a target network node, which first message is adapted to indicate that the condition is fulfilled for accessing the target cell, the accessing of the UE to the target cell relating to at least one of the UE being connected to more than one source cells wherein a handover of the UE from at least one of the source cells to the target cell is triggered and the UE being connected to a source cell additionally accesses to the target cell, obtain an indication that the access to the target cell is rejected, which indication is adapted to protect the target cell to be accessed by the UE, refrain from accessing the target cell for a configured time, and wherein the indication that the access to the target cell is rejected is adapted to be comprised in a message further comprising the configured time.

12. The UE according to claim 11, further being configured to:
send to a source network node, an indication that the access to the target cell is rejected.

13. The UE according to claim 11, further being configured to:
revert from a target cell configuration to a configuration used in the source cell.

14. The UE according to claim 11, wherein the indication that the access to the target cell is rejected, is adapted to be obtained when the target cell becomes overloaded.

15. A target network node in a wireless communications network, the target network node being configured to:
receive a first message from the UE, which first message indicates that a condition is fulfilled for the UE to access a target cell, the accessing of the UE to the target cell relating to at least one of the UE being connected to more than one source cells wherein a handover of the UE from at least one of the source cells to the target cell is triggered and the UE being connected to a source cell additionally accesses to the target cell;

send to the UE an indication that the access to the target cell is rejected, which indication is adapted to protect the target cell from being accessed by the UE; and the indication that the access to the target cell is rejected is adapted to be comprised in a second message further comprising a configured time during which configured time the UE shall refrain from accessing the target cell.

16. The target network node according to claim 15, wherein the indication that the access to the target cell is rejected, is adapted to be obtained when the target cell becomes overloaded.

* * * * *